(12) United States Patent
Lee

(10) Patent No.: US 12,114,066 B2
(45) Date of Patent: Oct. 8, 2024

(54) ELECTRONIC DEVICE FOR PROVIDING IMAGE PROCESSING SERVICE THROUGH NETWORK

(71) Applicant: Samsung Electronics Co., Ltd., Gyeonggi-do (KR)

(72) Inventor: Myunghun Lee, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 48 days.

(21) Appl. No.: 17/835,209

(22) Filed: Jun. 8, 2022

(65) Prior Publication Data

US 2022/0303450 A1 Sep. 22, 2022

Related U.S. Application Data

(63) Continuation of application No. PCT/KR2020/018649, filed on Dec. 18, 2020.

(30) Foreign Application Priority Data

Dec. 20, 2019 (KR) .......... 10-2019-0172243

(51) Int. Cl.
*H04N 23/661* (2023.01)
*H04N 23/63* (2023.01)
*H04N 23/80* (2023.01)

(52) U.S. Cl.
CPC ......... *H04N 23/661* (2023.01); *H04N 23/632* (2023.01); *H04N 23/80* (2023.01)

(58) Field of Classification Search
CPC .... H04N 23/661; H04N 23/632; H04N 23/80; H04N 5/262; H04N 21/222;
(Continued)

(56) References Cited

U.S. PATENT DOCUMENTS 6,714,204 B2 3/2004 Ishida et al.
9,600,853 B2 3/2017 Jang
(Continued)

FOREIGN PATENT DOCUMENTS

JP 2014-241089 A 12/2014
KR 2002-0023642 A 3/2002
(Continued)

*Primary Examiner* — Christopher K Peterson
(74) *Attorney, Agent, or Firm* — Cha & Reiter, LLC

(57) ABSTRACT

According to certain embodiments, an electronic device comprises: a communication module; and a processor operatively connected to the communication module and configured to transmit and receive data to and from external electronic devices through the communication module, and wherein the processor is configured to: receive a preview source image from a first external electronic device; performing a first image processing on the preview source image, thereby resulting in a preview image; transmitting the preview image to a second external electronic device and a third external electronic device; receive a request for second image processing from the second external electronic device; transmit a first modified preview image obtained by performing the second image processing on the preview image to the second external electronic device in response to the request; receive a request for third image processing form the third external electronic device; transmit a second modified preview image obtained by performing the third image processing on the preview image to the third external electronic device.

17 Claims, 16 Drawing Sheets

(58) Field of Classification Search
CPC .......... H04N 21/2743; H04N 21/8549; H04N 23/698; H04N 5/2628; H04N 21/2223
See application file for complete search history.

(56) References Cited

U.S. PATENT DOCUMENTS

| | | |
|---|---|---|
| 9,619,076 B2 | 4/2017 | Bernstein et al. |
| 10,168,826 B2 | 1/2019 | Bernstein et al. |
| 10,489,887 B2 | 11/2019 | El-Khamy et al. |
| 10,592,041 B2 | 3/2020 | Bernstein et al. |
| 10,929,961 B2 | 2/2021 | Kim et al. |
| 10,957,022 B2 | 3/2021 | Kim et al. |
| 10,970,820 B2 | 4/2021 | El-Khamy et al. |
| 10,996,788 B2 | 5/2021 | Bernstein et al. |
| 2002/0059460 A1 | 5/2002 | Ishida et al. |
| 2015/0161755 A1* | 6/2015 | Jang .......................... G06T 1/20 |
| | | 345/503 |
| 2018/0336666 A1 | 11/2018 | Kim et al. |
| 2019/0251670 A1 | 8/2019 | Kim et al. |
| 2019/0268536 A1* | 8/2019 | Han ....................... H04N 23/80 |
| 2021/0006706 A1* | 1/2021 | Koci ...................... G03B 17/56 |
| 2021/0067690 A1 | 3/2021 | Im et al. |
| 2021/0224953 A1 | 7/2021 | El-Khamy et al. |

FOREIGN PATENT DOCUMENTS

| | | |
|---|---|---|
| KR | 10-2015-0068192 A | 6/2015 |
| KR | 10-2016-0142418 A | 12/2016 |
| KR | 10-2018-0114488 A | 10/2018 |
| KR | 10-2019-0096748 A | 8/2019 |
| KR | 10-2019-0098406 A | 8/2019 |
| KR | 10-2019-0101534 A | 9/2019 |

* cited by examiner

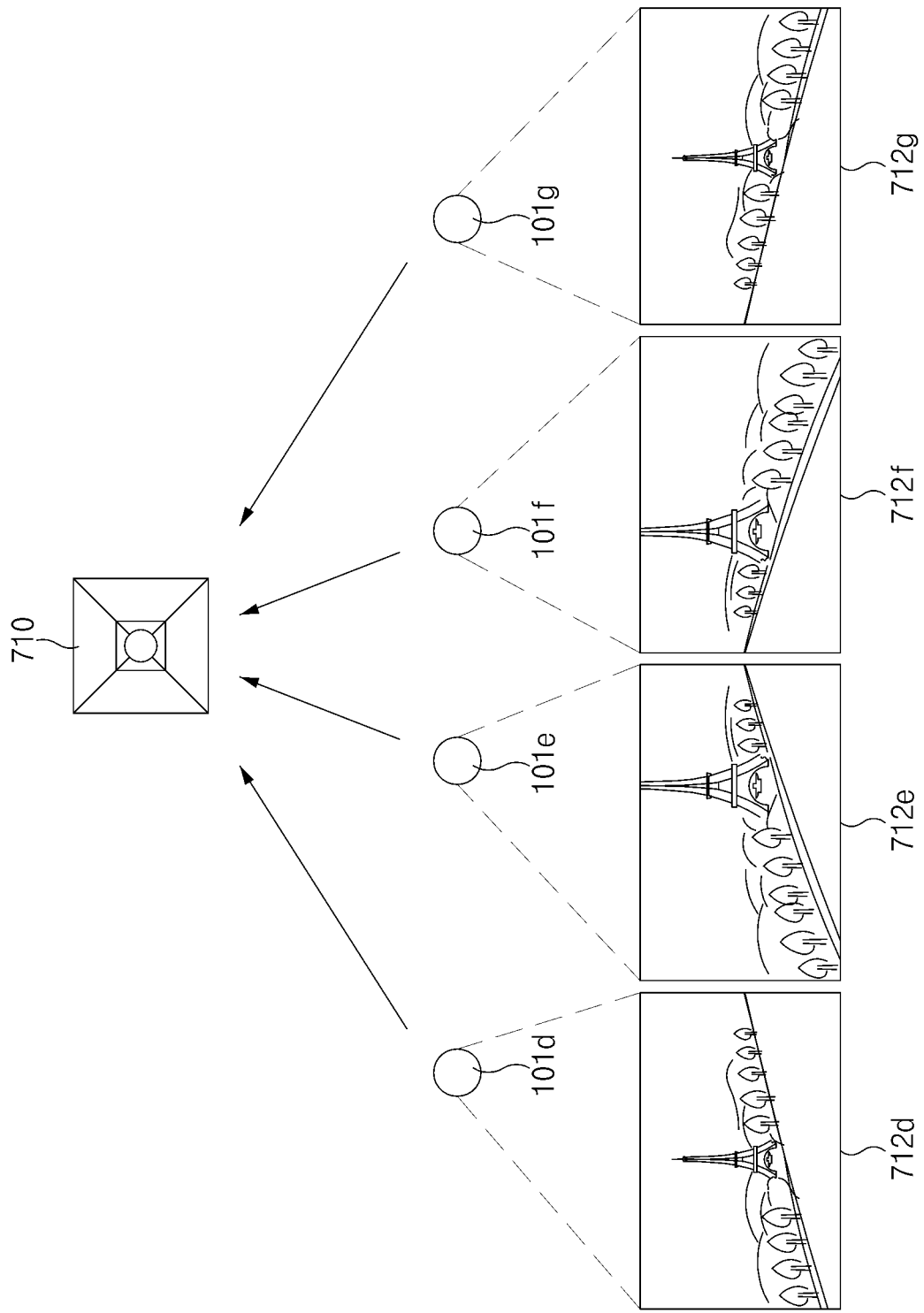

ELECTRONIC DEVICE FOR PROVIDING IMAGE PROCESSING SERVICE THROUGH NETWORK

CROSS-REFERENCE TO RELATED APPLICATION(S)

This application is a continuation of PCT Application PCT/KR2020/018649, filed Dec. 18, 2020, that claims priority to Korean Patent Application No. 10-2019-0172243, filed Dec. 20, 2019 in the Korean Intellectual Property Office, the disclosure of which are herein incorporated by reference in their entirety.

BACKGROUND

1) Technical Field

The disclosure relates to a technology for providing an image processing service through a network.

2) Description of Related Art

An electronic device that processes an image may acquire a raw image through an image sensor. The acquired raw image may be processed by an embedded image signal processor (ISP). The image signal processor may process the received raw image using an image quality improvement algorithm, and thus may provide an image with improved image quality. The image signal processor may process various processes such as a white balance adjustment, a color adjustment (e.g., a color matrix, a color correction, or a color enhancement), a color filter array interpolation, a noise reduction or sharpening, and an image enhancement (e.g., a high-dynamic-range (HDR), a face detection). The image output from the image signal processor may have, for example, a YUV format. The image output from the image signal processor may be compressed, for example, by JPEG compression, and the compressed image may be stored in the electronic device.

Computer vision-based technology may be too difficult to be performed in a terminal device. Using cloud cameras limitedly in passive scenarios such as monitoring or video communication uses the cloud server only as an auxiliary technology or a supporting technology.

Certain embodiments of the disclosure provide a method for sharing an image photographed by one electronic device in a plurality of other electronic devices through a cloud server.

Certain embodiments of the disclosure individually provide images to which different image processing is applied through a cloud server with respect to images photographed at different places to a plurality of different electronic devices.

SUMMARY

According to certain embodiments, an electronic device comprises: a communication module; and a processor operatively connected to the communication module and configured to transmit and receive data to and from external electronic devices through the communication module, and wherein the processor is configured to: receive a preview source image from a first external electronic device; performing a first image processing on the preview source image, thereby resulting in a preview image; transmitting the preview image to a second external electronic device and a third external electronic device; receive a request for second image processing from the second external electronic device; transmit a first modified preview image obtained by performing the second image processing on the preview image to the second external electronic device in response to the request; receive a request for third image processing form the third external electronic device; transmit a second modified preview image obtained by performing the third image processing on the preview image to the third external electronic device.

According to certain embodiments, an electronic device comprises: a communication module; and a processor operatively connected to the communication module and configured to transmit and receive data to and from a first external electronic device through the communication module, and wherein the processor is configured to: receive, from the first external electronic device, a preview image, wherein the preview image comprises application of a first image processing on a preview source image photographed by a second external electronic device through the first external electronic device; request a second image processing related to the preview image to the first external electronic device; and receive a modified preview image obtained, wherein the modified preview image comprises application of the second image processing on the preview image.

Certain embodiments comprise a non-transitory computer-readable medium storing a plurality of instructions, wherein execution of the plurality of instructions by a processor causes the processor to perform a plurality of operations comprising: receiving a preview source image from a first external electronic device; performing a first image processing on the preview source image, thereby resulting in a preview image; transmitting the preview image to a second external electronic device and a third external electronic device; receiving a request for second image processing from the second external electronic device; transmitting a first modified preview image obtained by performing the second image processing on the preview image to the second external electronic device in response to the request; receiving a request for third image processing form the third external electronic device; and transmitting a second modified preview image obtained by performing the third image processing on the preview image to the third external electronic device.

BRIEF DESCRIPTION OF THE DRAWINGS

FIG. 7C is a diagram illustrating another example of preview source images obtained from a network environment according to an embodiment.

With regard to description of drawings, the same or similar components will be marked by the same or similar reference signs.

DETAILED DESCRIPTION

According to embodiments disclosed in the disclosure, an image photographed by one electronic device may be shared by a plurality of other electronic devices through a cloud server.

According to embodiments disclosed in the disclosure, images to which different image processing is applied through a cloud server with respect to images photographed at different places may be individually provided to a plurality of electronic devices.

In addition, various effects directly or indirectly identified through this document may be provided.

Hereinafter, certain embodiments of the disclosure will be described with reference to accompanying drawings. However, those of ordinary skill in the art will recognize that modification, equivalent, and/or alternative on certain embodiments described herein can be variously made without departing from the scope and spirit of the disclosure.

Figure 1:
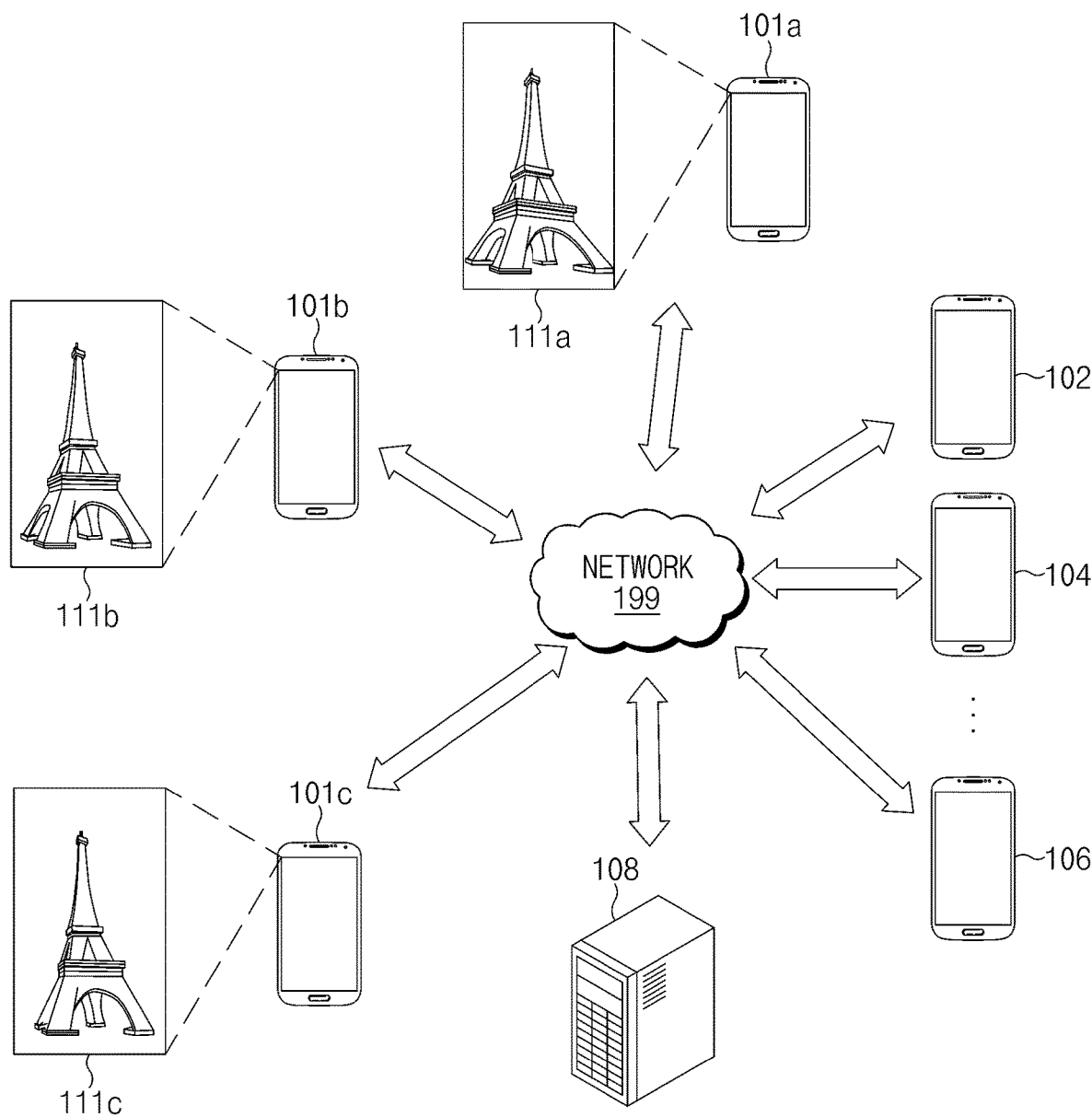
FIG. 1 is a diagram illustrating a plurality of electronic devices and a server in a network environment according to an embodiment.

FIG. 1 is a diagram illustrating a plurality of electronic devices and a server in a network environment 100 according to an embodiment.

Referring to FIG. 1, a plurality of electronic devices 101a, 101b, 101c, 102, 104, and 106 may be connected to a server 108 (e.g., a cloud server) through a network 199 (e.g., a cloud network). For example, the server 108 may receive access requests from the plurality of electronic devices 101a, 101b, 101c, 102, 104, and 106. The server 108 may approve the access requests through a specified confirmation procedure, and the plurality of electronic devices 101a, 101b, 101c, 102, 104, and 106 may be connected to the server 108.

Each of the electronic devices 101a, 101b, and 101c may capture an image 111a, 111b, 111c, of an object (the Eiffel Tower) from their vantage point.

At least one of the plurality of electronic devices 101a, 101b, 101c, 102, 104, and 106 may transmit an image 111 to the server 108. The electronic devices connected to the server 108 may identify the image and may request different image processing to the server 108 individually with respect to the image. For example, the first electronic device 101a may acquire (or photograph, now collectively referred to as acquire) a source image 111a (e.g., an image, raw data, or an RGB image related to a place where the first electronic device 101a is located). and the electronic device 101a may transmit the source image 111a to the server 108 through the network 199. The server 108 may generate a preview image (e.g., a YUV image) obtained by performing a first image processing (e.g., default image processing, sharpening, or data format change to a YUV using an image signal processor) on the source image 111a. The server 108 may provide the preview image to the electronic devices 102, 104, and 106.

Each of the first electronic devices 101a, 101b, and 101c may acquire an image of photographing target (e.g., Eiffel Tower in Paris) at different positions (or angles). For example, the electronic device 101a may acquire the source image 111a obtained by photographing a first side (e.g., a right side of the Eiffel Tower) of the photographing target. The electronic device 101b may acquire the source image 111b obtained by photographing a second side (e.g., a front of the Eiffel Tower) of the photographing target. The electronic device 101c may acquire the source image 111c obtained by photographing a third side (e.g., a left side of the Eiffel Tower) of the photographing target.

The electronic devices 102, 104, and 106 may separately request that the server 108 perform image processing on the preview image. For example, the electronic device 102 may request white balance (WB with respect to the preview image to the server 108. The electronic device 104 may request application of a bokeh effect with respect to the preview image. Electronic device 106 may request another image processing different from WB or the Bokeh effect with respect to the preview image. The server 108 may provide a modified preview images. The server 108 may provide a modified preview image with white balancing to electronic device 102, a modified preview image with the Bokeh effect to electronic device 104, and a modified preview image with another image processing to electronic device 106.

The electronic devices 102, 104, and 106 may separately request a modified still image corresponding to the modified preview image to the server 108. For example, a user of each of the electronic devices 102, 104, and 106 may check a modified preview image that is image-processed according to their tastes, and may determine whether they are satisfied. When a user of each of the electronic devices 102, 104, and 106 is satisfied with the modified preview image, each of the electronic devices 102, 104, and 106 may receive a user input requesting a modified still image corresponding to the modified preview image. Each of the electronic devices 102, 104, and 106 may request a modified still image corresponding to the modified preview image to the server 108 based on the user input.

When a request for a modified still image is received, the server 108 may identify a modified preview image corresponding to the modified still image, may identify a preview source image through the modified preview image, and may request a still source image corresponding to the identified preview source image to the first electronic device 101. The server 108 may transmit, to each of the electronic devices 102, 104, and 106, a modified still image obtained by performing the requested image processing on the still source image received from the first electronic device 101. That is, electronic devices 102, 104, and 106 may receive modified still images with different image processing (or same image processing), based on the respective user inputs.

The server 108 may generate the modified preview image in response to an image processing request of at least one of the electronic devices 102, 104, and 106 based on the preview source image, which can be photographed by the first electronic device 101*a*. The server 108 may transmit the modified preview image to the one of the electronic devices 102, 104, and 106. In addition, the server 108 may transmit the modified preview images to the first electronic device 101.

As described above, an image photographed by the electronic device (e.g., the first electronic device 101) including a camera may be shared with the electronic devices 102, 104, and 106 located in other places. Accordingly, a user of the electronic devices 102, 104, and 106 may obtain an effect (e.g., an effect of photographing according to a user-specified setting of the electronic devices 102, 104, and 106 and an effect of photographing according to a user's taste of the electronic devices 102, 104, and 106) of photographing an image of a place that the user is not presently at. The place may even be a place that the user has never visited or cannot go to.

Also, each of the electronic devices 102, 104, and 106 may request a separate image processing to the server 108. In addition, overloading of the network 199 may be prevented by sharing a preview image of less than a specified capacity (e.g., low capacity), and when necessary. That is, the user can preview low bandwidth consuming (low resolution, compressed) preview images and try different image processing. When the user finds modified preview image that they are satisfied with, the electronic devices 102, 104, and 106 may acquire a high-quality still image through a still image request.

The electronic device (e.g., the first electronic device 101) that photographs the image may share various preview images modified by the electronic devices 102, 104, and 106. Therefore, the user of the electronic device (e.g., the first electronic device 101) that photographs the image may acquire images with various tastes applied.

In certain embodiments, electronic devices 101*a*, 101*b*, 101*c*, 102, and 104 form a group on a social media application. Moreover, the group may have a unique account with the server 108, and each of the electronic devices 101*a*, 101*b*, 101*c*, 102, and 104 access the server 108 through a group account.

Figure 2:
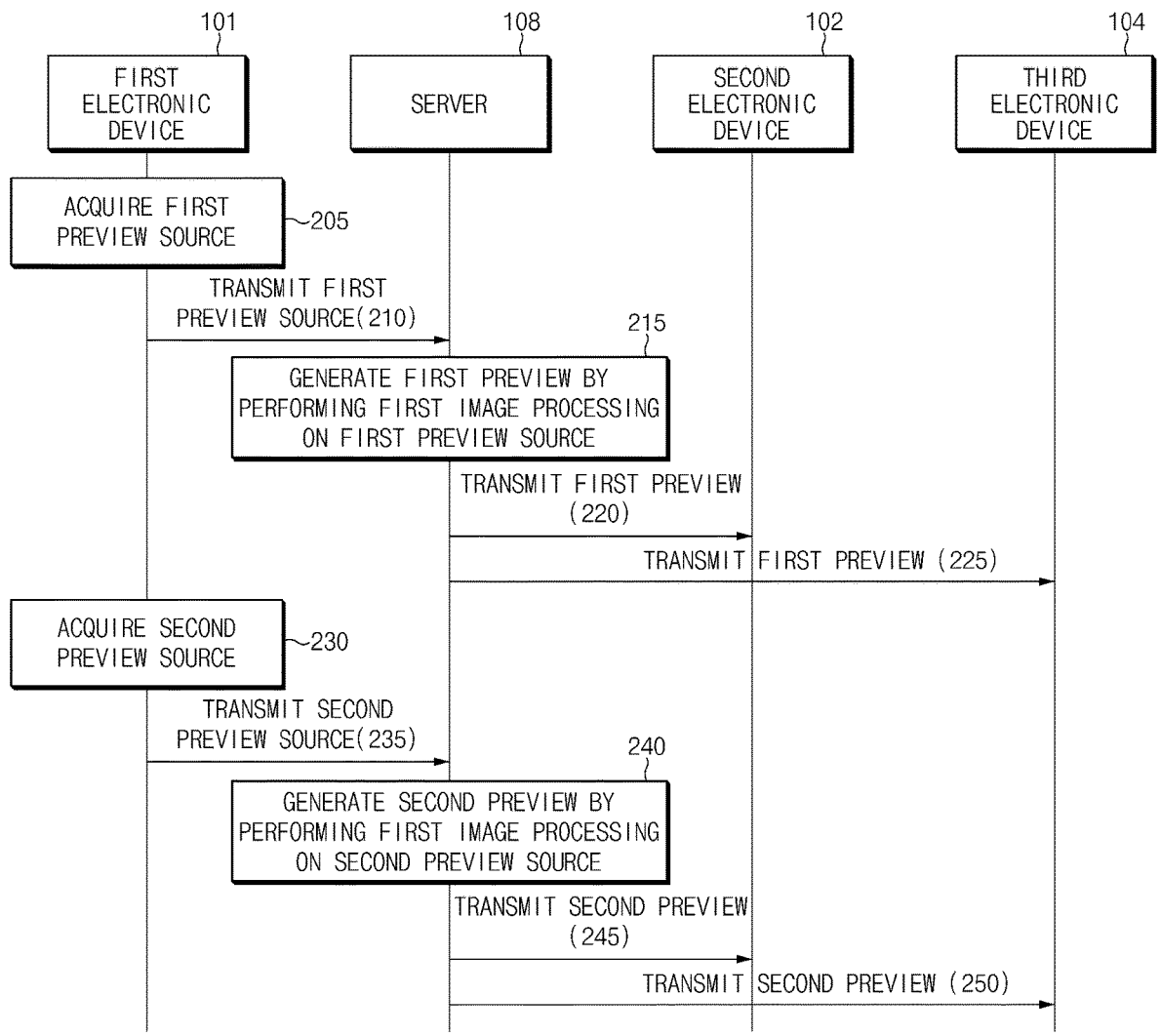
FIG. 2 is a flowchart illustrating an example of a sharing operation of a preview image in a network environment according to an embodiment.

FIG. 2 is a flowchart illustrating an example of a sharing operation of a preview image in a network environment according to an embodiment.

Figure 3:
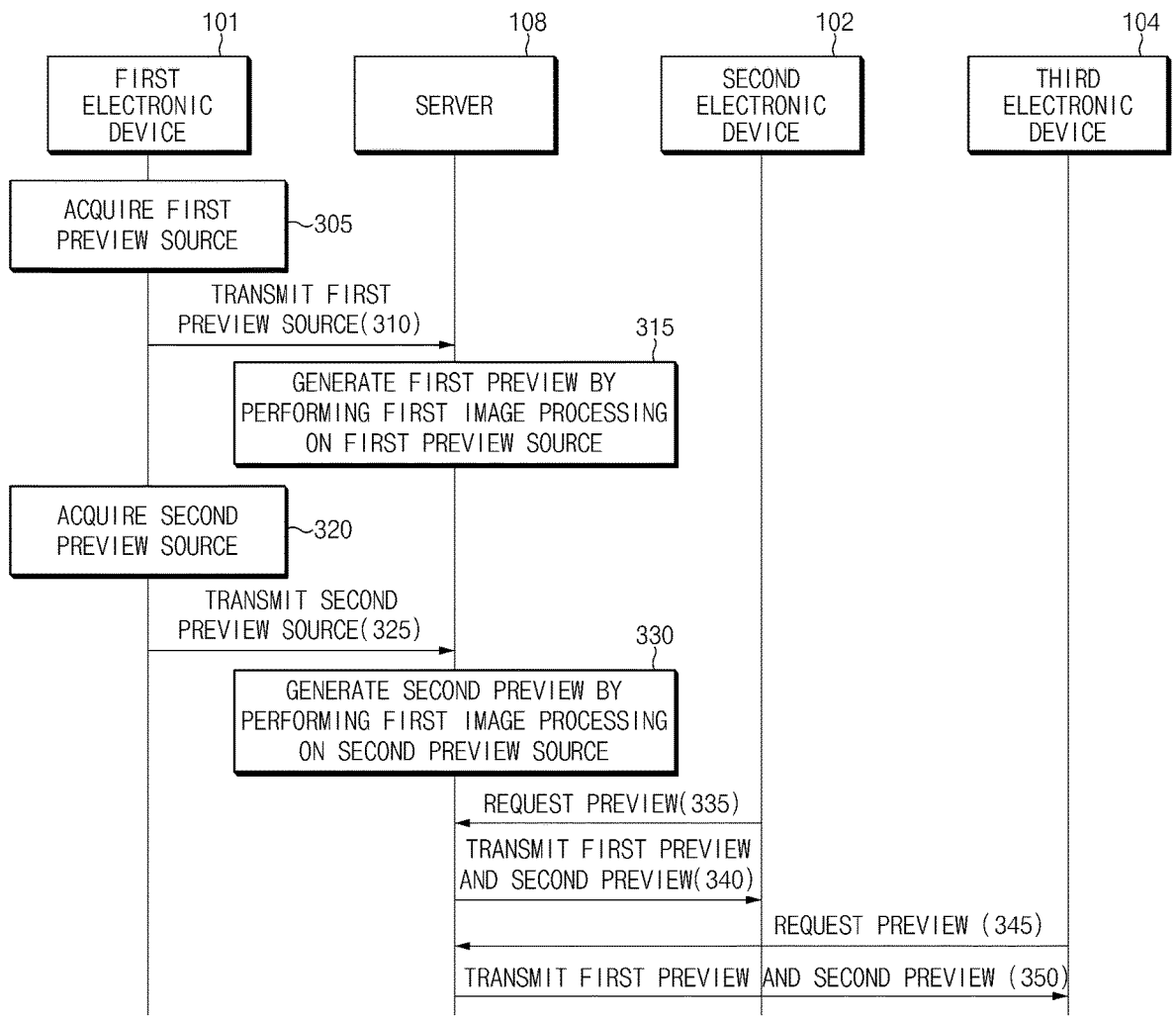
FIG. 3 is a flowchart illustrating another example of a sharing operation of a preview image in a network environment according to certain embodiments.
Figure 4:
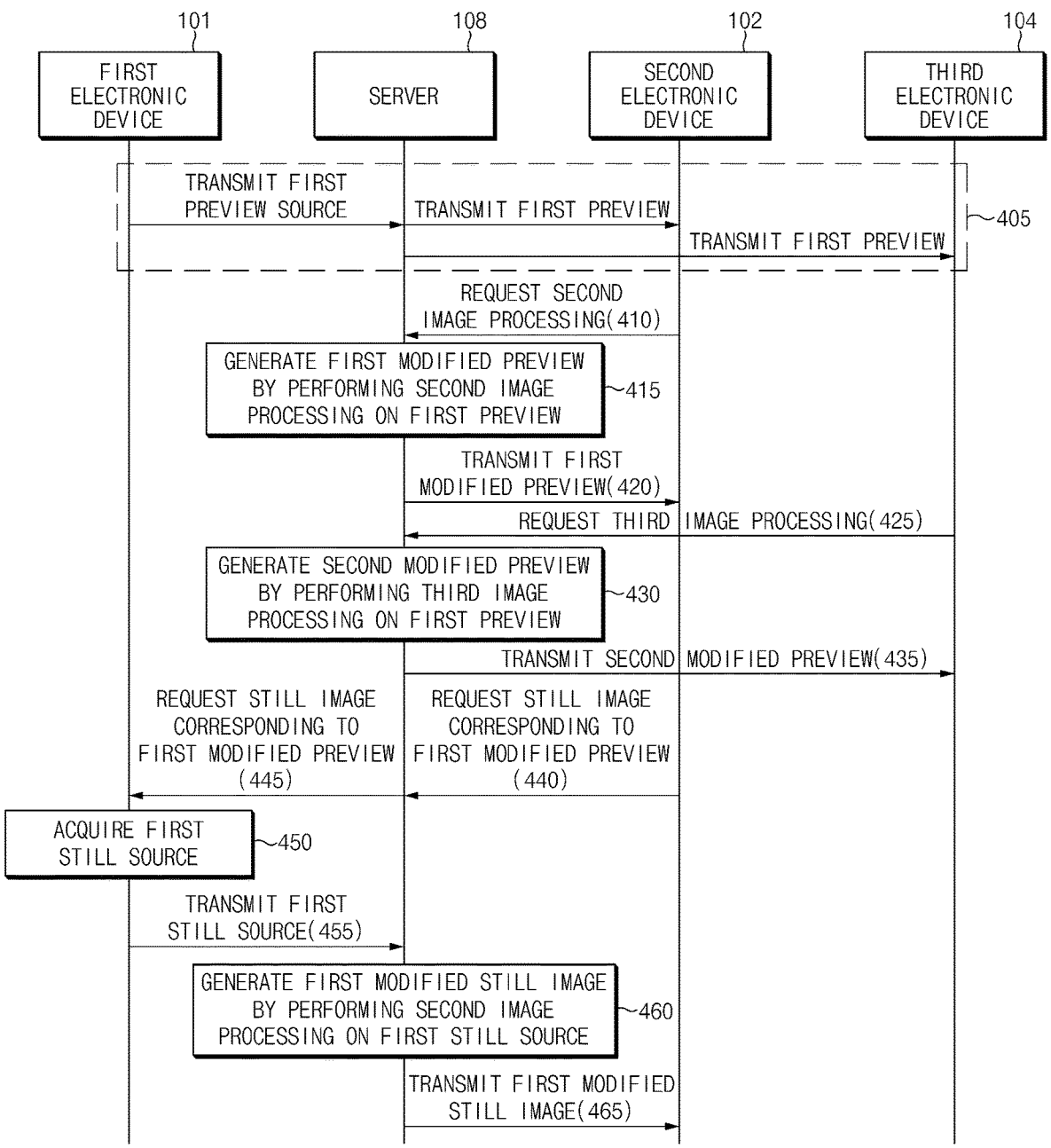
FIG. 4 is a flowchart illustrating an example of an image processing service method in a network environment according to an embodiment.

FIGS. 2-4 will describe an electronic device that acquires preview source images, which will be referred to as a first electronic device, and will include any electronic device 101 of electronic device 101*a*, 101*b*, and 101*c*. FIGS. 2-4 will also describe two electronic devices that might not be at the location depicted in the preview source image, that receive the preview images from the server 108. These will be referred to as the second electronic device 102 and third electronic device 104. It is noted, however, that any of the electronic devices of FIG. 1 can serve as the first, second, or third electronic device.

Referring to FIGS. 1 and 2, a plurality of electronic devices (e.g., the first electronic device 101 (e.g., one of 101*a*, 101*b*, and 101*c* of FIG. 1), the second electronic device 102, or the third electronic device 104) may be connected to the server 108 through the network 199 (e.g., a cloud network). The first electronic device 101 (e.g., the electronic device including a camera) may transmit (or upload) at least one preview source image (e.g., an image, raw data, or an RGB image related to a place where the first electronic device 101 is located) to the server 108. The preview source image can be the image that is displayed when the camera function is used, but the user has not snapped. For example, the preview image can be the contents of the charged coupled display.

The server 108 may provide (or share) the preview source image (or a preview image on which basic image processing is performed on the preview source image) to the at least one other electronic device (e.g., the second electronic device 102 or the third electronic device 104).

In operation 205, the first electronic device 101 may acquire a first preview source image (e.g., raw data). For example, the first electronic device 101 may photograph the first preview source image at a current location. The first preview source image may be photographed to have a smaller capacity (e.g., a lower capacity) than a specified capacity. The first preview source image may be generated in an RGB format.

In operation 210, the first electronic device 101 may transmit the first preview source image to the server 108. For example, the first electronic device 101 may register the first preview source image in the server 108.

In operation 215, the server 108 may generate a first preview image by performing the first image processing on the first preview source image. For example, the server 108 may include a high-performance image signal processor (ISP). Accordingly, the server 108 may perform an image processing operation that is difficult to be performed by the first electronic device 101, the second electronic device 102, or the third electronic device 104. For example, the first image processing may include a basic image processing. The first image processing may include a sharpening operation or a data format change to YUV. The first preview image may be generated in a YUV format. According to certain embodiments, the server 108 may use the first preview source image as it is as the first preview image without performing the first image processing.

The server 108 may transmit the first preview image to the second electronic device 102 and the third electronic device 104, respectively. For example, in operation 220, the server 108 may transmit the first preview image to the second electronic device 102. For example, in operation 225, the server 108 may transmit the first preview image to the third electronic device 104. In certain embodiments, the first electronic device 101, second electronic device 102 and the third electronic device 104 are part of a group on a social media application, or access the server 108 through a group account. In certain embodiments, operations 220 and 225 can be in response to request from the second electronic device 102 and the third electronic device 104.

In operation 230, the first electronic device 101 may acquire (or photograph) a second preview source image different from the first preview source image.

In operation 235, the first electronic device 101 may transmit the second preview source image to the server 108 (or register it in the server 108). In operation 240, the server 108 may generate a second preview image by performing the first image processing on the second preview source image (or the server 108 may use the second preview source image as it is as the second preview image without performing the first image processing). In operation 245, the server 108 may transmit the second preview image to the second electronic device 102. In operation 250, the server 108 may transmit the second preview image to the third electronic device 104. In certain embodiments, operations 245 and 250 can be in response to request from the second electronic device 102 and the third electronic device 104.

The first electronic device 101 may acquire an additional preview source image, and processes similar to operations 205 to 225 (or operations 230 to 250) may be repeatedly performed with respect to the additional preview source image.

According to certain embodiments, a preview source image is acquired by the second electronic device 102 or the third electronic device 104, and processes similar to operations 205 to 225 (or operations 230 to 250) may be performed with respect to the preview source image.

FIG. 3 is a flowchart illustrating another example of a sharing operation of a preview image in a network environment according to certain embodiments.

Referring to FIGS. 1 and 3, a plurality of electronic devices (e.g., the first electronic device 101, the second electronic device 102, or the third electronic device 104) may be connected to the server 108 through the network 199 (e.g., a cloud network). The first electronic device 101 (e.g., the electronic device including a camera) may transmit (or upload) at least one preview source image to the server 108. The server 108 may provide (or share) the preview source image when there is a request from at least one other electronic device (e.g., the second electronic device 102 or the third electronic device 104).

In operation 305, the first electronic device 101 may acquire (or photograph) a first preview source image (e.g., raw data). In operation 310, the first electronic device 101 may transmit the first preview source image to the server 108. In operation 315, the server 108 may generate a first preview image by performing basic first image processing on the first preview source image.

In operation 320, the first electronic device 101 may acquire (or photograph) a second preview source image different from the first preview source image. In operation 325, the first electronic device 101 may transmit the second preview source image to the server 108. In operation 330, the server 108 may generate a second preview image by performing the first image processing on the second preview source image. For example, when there is no preview transmission request from the second electronic device 102 or the third electronic device 104, the server 108 may store the first preview image and the second preview image without transmitting them.

When a preview transmission request is received from each electronic device, the server 108 may transmit a preview image in response to the received preview transmission request. For example, in operation 335, the second electronic device 102 may transmit a preview transmission request to the server 108. In operation 340, the server 108 may transmit the first preview image and the second preview image to the second electronic device 102 in response to the preview transmission request from the second electronic device 102. In operation 345, the third electronic device 104 may transmit a preview transmission request to the server 108. In operation 350, the server 108 may transmit the first preview image and the second preview image to the third electronic device 104 in response to the preview transmission request from the third electronic device 104.

The first electronic device 101, the second electronic device 102, or the third electronic device 104 may transmit an additional preview source image to the server 108. The server 108 may generate an additional preview image by performing the first image processing on the additional preview source image. When the preview transmission request from the first electronic device 101, the second electronic device 102, or the third electronic device 104 is received, the server 108 may transmit the additional preview image to the electronic device that transmits the preview transmission request.

While the foregoing provides the preview image to the second electronic device 102 and the third electronic device 104, the users at the second electronic device 102 and the third electronic device 104 can request different image processing on the preview images, resulting in different modified preview images, according to the requested image processing. At that point, a user at the second electronic device 102 or the third electronic device 104, can review the modified preview image.

FIG. 4 is a flowchart illustrating an example of an image processing service method in a network environment according to an embodiment.

Referring to FIGS. 1 and 4, a plurality of electronic devices (e.g., the first electronic device 101, the second electronic device 102, or the third electronic device 104) may be connected to the server 108 through the network 199 (e.g., a cloud network). In operation 405, based on the processes of FIG. 2 or FIG. 3, the first electronic device 101 may transmit a first preview source image to the server 108, and the server 108 may transmit a first preview image generated by performing the first image processing on the first preview source image to the second electronic device 102 or the third electronic device 104.

In operation 410, the second electronic device 102 may request the second image processing with respect to the first preview image. For example, the user of the second electronic device 102 may confirm the first preview image and may request white balancing change. The second electronic device 102 may request the white balancing change processing to the server 108 based on the user's input.

In operation 415, in response to the second image processing request, the server 108 may generate a first modified preview image by performing the second image processing on the first preview image. For example, the first modified preview image may be an image of which white balance is modified from the first preview image. In operation 420, the server 108 may transmit the first modified preview image to the second electronic device 102.

In operation 425, the third electronic device 104 may request a third image processing with respect to the first preview image. For example, the user of the third electronic device 104 may confirm the first preview image and may determine request application of the bokeh effect. The third electronic device 104 may request the third image processing to the server 108 based on a user input related to the third image processing.

In operation 430, in response to the third image processing request, the server 108 may generate a second modified preview image by performing the third image processing on the first preview image. For example, the second modified preview image may be an image to which a bokeh effect is applied to the first preview image. For example, in operation 435, the server 108 may transmit the second modified preview image to the third electronic device 104.

At this point, the user at the second electronic device 102 and the user at the third electronic device 104 can review the first modified preview image and the second modified preview image. The modified preview images can provide the user with reasonable expectation of how the modified still image will appear.

In operation 440, the second electronic device 102 may request a still image (or a still source image) corresponding to the first modified preview image in response to a user input. For example, the user of the second electronic device 102 may be satisfied with the second image processing that was applied to the first modified preview image. Accordingly, the user of the second electronic device 102 may desire a high-quality image corresponding to the first modified preview image. Accordingly, when a user input requesting a still image corresponding to the first modified preview image is received, the second electronic device 102 may request the still image to the server 108. For example, the still image may be an image of higher quality, higher resolution, or larger capacity than the first preview source image.

In operation 445, based on the still image request from the second electronic device 102, the server 108 may request a still source image from the first electronic device 101.

In operation 450, the first electronic device 101 may acquire a first still source image (e.g., raw data) corresponding to the first preview source image. For example, when the first preview source image is acquired, the first electronic device 101 may also acquire (or photograph) the first still source image to store it. Alternatively, when a request for the still source image, the user of the first electronic device 101 may photograph the first still source image corresponding to the first preview source image.

In operation 455, the first electronic device 101 may transmit the first still source image to the server 108. In operation 460, the server 108 may generate a first modified still image by performing the second image processing on the first still source image. For example, in operation 465, the server 108 may transmit the first modified still image to the second electronic device 102. In certain embodiments, the first image processing is not performed on the still source image.

Although not illustrated in FIG. 4, the third electronic device 104 may also request a second modified still image corresponding to the second modified preview image, and the server 108 may provide the second modified still image to the third electronic device 104, which would be the still image with the third image processing applied.

As described above, the second electronic device 102 or the third electronic device 104 may share an image of the first electronic device 101 located in a different location. Accordingly, the user of the second electronic device 102 or the third electronic device 104 may obtain an effect of taking a picture of a place that is remote. Also, the second electronic device 102 and the third electronic device 104 may request separate image processing to the server 108, respectively. In addition, overloading of the network 199 may be prevented by sharing a preview image of less than a specified capacity (e.g., low capacity), and when necessary, the second electronic device 102 and the third electronic device 104 may acquire a high-quality still image through a still image request.

In certain embodiments, the modified preview images with the second and third image processing can also be presented to the first electronic device 101.

Figure 5:
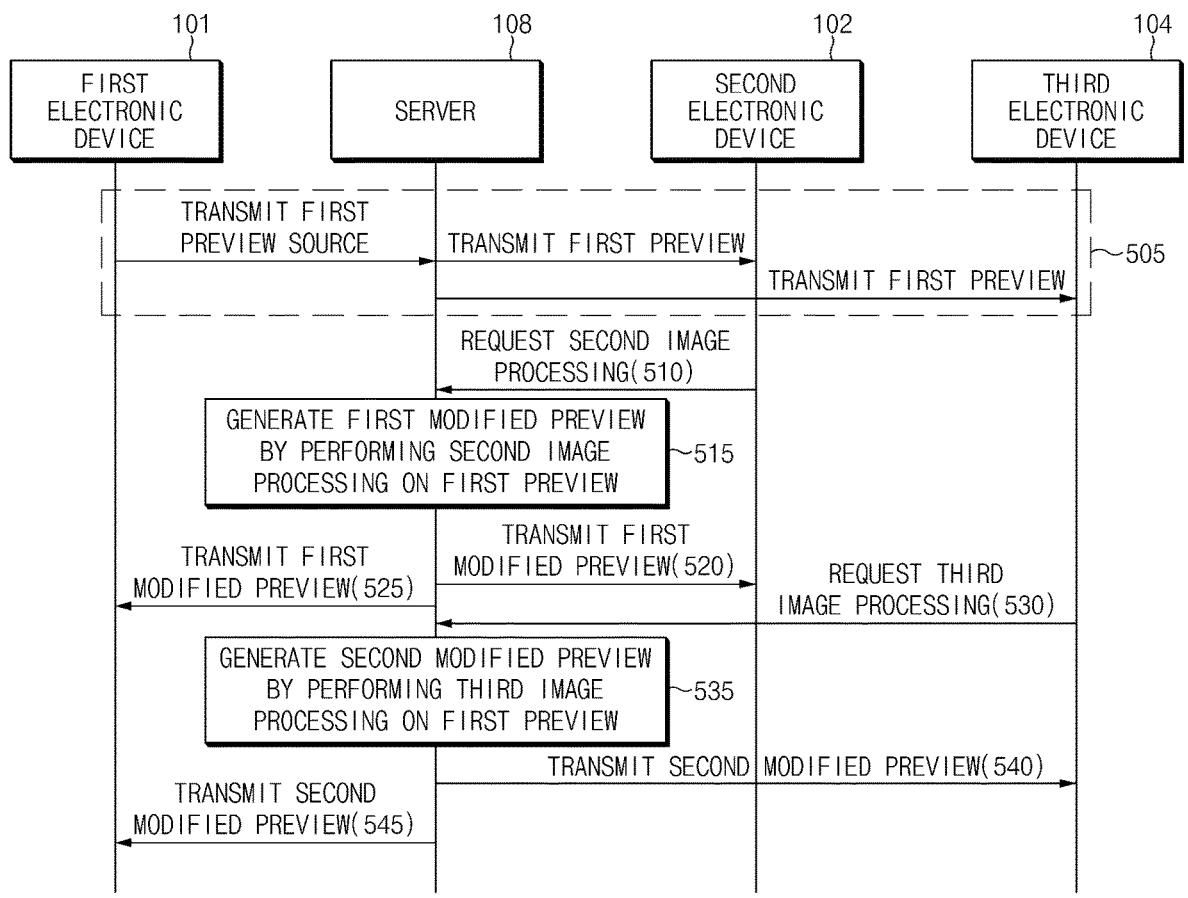
FIG. 5 is a flowchart illustrating another example of an image processing service method in a network environment according to certain embodiments.
Figure 6:
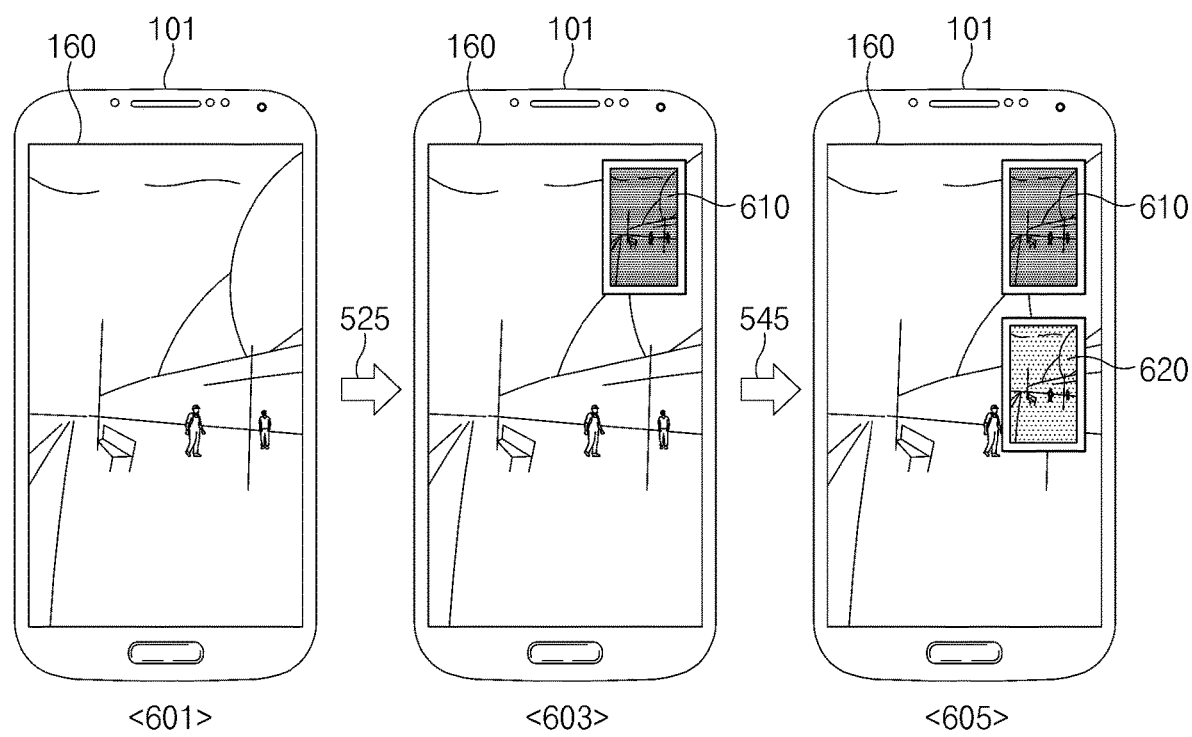
FIG. 6 is a diagram illustrating a display screen of a first electronic device of FIG. 5.

FIG. 5 is a flowchart illustrating another example of an image processing service method in a network environment according to certain embodiments. FIG. 6 is a diagram illustrating a display screen of a first electronic device of FIG. 5.

Referring to FIGS. 1 and 5, a plurality of electronic devices (e.g., the first electronic device 101, the second electronic device 102, or the third electronic device 104) may be connected to the server 108 through the network 199 (e.g., a cloud network). In operation 505, based on the processes of FIG. 2 or FIG. 3, the first electronic device 101 may transmit a first preview source image to the server 108, and the server 108 may transmit a first preview image generated by performing the first image processing on the first preview source image to the second electronic device 102 or the third electronic device 104. As an example, the second electronic device 102 or the third electronic device 104 may display the first preview image on the display in the same way as or similarly to 603 or 605 of FIG. 6.

In operation 510, the second electronic device 102 may request the second image processing (e.g., white balance change) with respect to the first preview image. In operation 515, in response to the second image processing request, the server 108 may generate a first modified preview image by performing the second image processing on the first preview image. For example, in operation 520, the server 108 may transmit the first modified preview image to the second electronic device 102. As an example, the second electronic device 102 may display the first modified preview image on the display in the same way as or similarly to 603 or 605 of FIG. 6.

In operation 525, the server 108 may also transmit the first modified preview image to the first electronic device 101. For example, referring to 603 of FIG. 6, the first electronic device 101 may display a thumbnail 610 of the first modified preview image on a partial region of a display 160. Accordingly, the user of the first electronic device 101 may receive (or share, or recommend) a preview image (e.g., the first modified preview image) obtained by performing image processing depending on tastes of other users on the first preview source image photographed by the user.

In operation 530, the third electronic device 104 may request a third image processing (e.g., applying Bokeh effect) with respect to the first preview image. In operation 535, in response to the third image processing request, the server 108 may generate a second modified preview image by performing the third image processing on the first preview image. For example, in operation 540, the server 108 may transmit the second modified preview image to the third electronic device 104. As an example, the third electronic device 104 may display the second modified preview image on the display in the same way as or similarly to 603 or 605 of FIG. 6.

In operation 545, the server 108 may also transmit the second modified preview image to the first electronic device 101. For example, referring to 605 of FIG. 6, the first electronic device 101 may display the thumbnail 610 of the first modified preview image and a thumbnail 620 of the second modified preview image on a partial region of the display 160. Therefore, the user of the first electronic device 101 may receive (or share, or recommend) various preview images (e.g., the first modified preview image and the second modified preview image) obtained by performing image processing depending on tastes of other users on the first preview source image photographed by the user.

According to certain embodiments, in FIG. 6, a user input (e.g., a touch) for the thumbnail 610 or the thumbnail 620 is received, the first electronic device 101 may apply the first modified preview image or the second modified preview image to an entire screen of the display 160.

As described above, the first electronic device 101 may receive (or share, or recommend) various preview images (e.g., the first modified preview image and the second modified preview image) modified by the second electronic device 102 and the third electronic device 104. Accordingly, the user of the first electronic device 101 may acquire images to which various tastes are applied to an image photographed by the user.

Figure 7A:
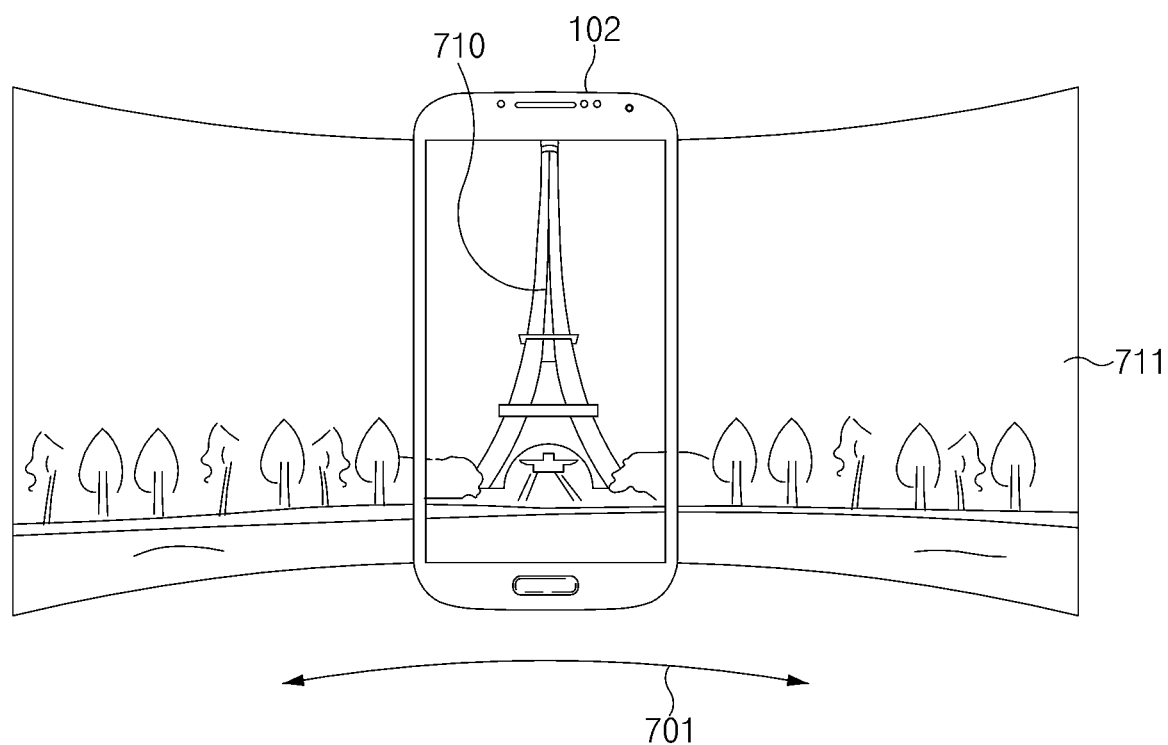
FIG. 7A is a diagram illustrating an example of a user interface of a plurality of electronic devices receiving an image processing service in a network environment according to an embodiment.
Figure 7B:
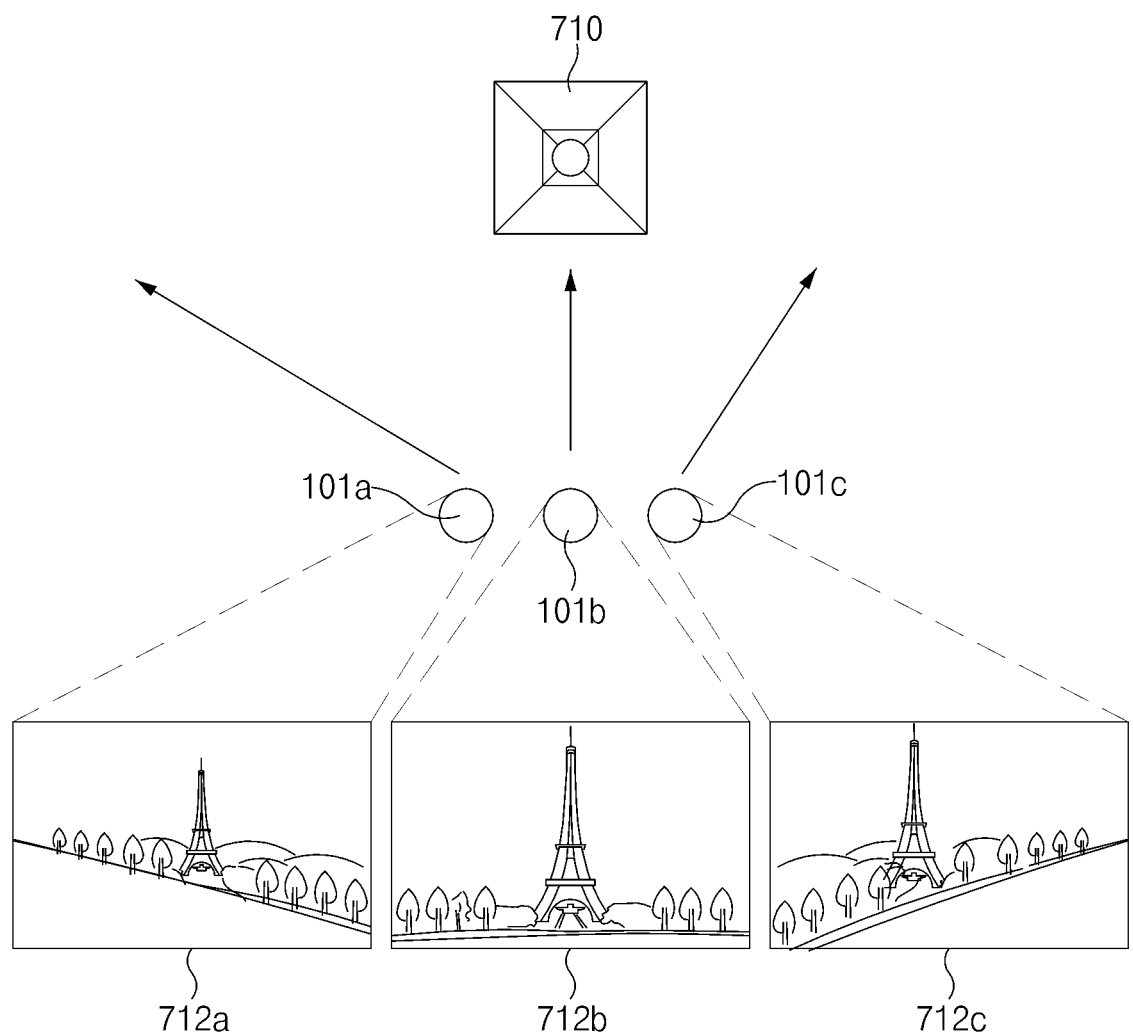
FIG. 7B is a diagram illustrating an example of preview source images obtained from a network environment according to an embodiment.

FIG. 7A is a diagram illustrating an example of a user interface of a plurality of electronic devices receiving an image processing service in a network environment, according to an embodiment. FIG. 7B is a diagram illustrating an example of a method of acquiring preview source images in a network environment according to an embodiment. FIG. 7C is a diagram illustrating another example of a method of acquiring preview source images in a network environment according to an embodiment.

In certain embodiments, when many electronic devices 101 are in the same vicinity, the images captured by the electronic devices 101 can be used to allow users at remote locations (users of electronic devices 102 and 104) to scan the scene using pictures from electronic device 101. This can happen, for example, at places that have heavy visitor traffic, such as a tourist destination.

Referring to FIGS. 1 and 7A to 7C, the server 108 may receive preview source images 712a to 712g photographed at various angles (or directions) with respect to one specific object (or place) 710 (e.g., the Eiffel Tower in Paris) from a plurality of electronic devices (e.g., the first electronic devices 101a to 101g). The server 108 may generate a preview search image 711 by using the preview source images 712a to 712g. The preview search image 711 may include a panoramic image of the specific object (or place) 710.

Referring to FIG. 7B, some 101a, 101b, and 101c of the first electronic devices may photograph a specific object (or place) 710 in different directions from a similar location. For example, the electronic device 101a may acquire a preview source image 712a by photographing a left direction with respect to the specific object (or place) 710. The electronic device 101b may acquire a preview source image 712b by photographing a front direction with respect to the specific object (or place) 710. The electronic device 101c may acquire a preview source image 712c by photographing a right direction with respect to the specific object (or place) 710.

Referring to FIG. 7C, other portions 101d, 101e, 101f, and 101g of the first electronic devices may photograph the specific object (or place) 710 at different locations. For example, the electronic device 101d or the electronic device 101e may acquire a preview source image 712d or a preview source image 712e by photographing the specific object (or place) 710 from the left side with respect to the specific object (or place) 710. The electronic device 101f or the electronic device 101e may acquire a preview source image 712f or a preview source image 712g by photographing the specific object (or place) 710 from the right side with respect to the specific object (or place) 710. According to an embodiment, at least one of the first electronic devices 101a to 101g may register at least one of the preview source images 712a to 712g in the server 108. The server 108 may generate the preview search image 711 by using the registered preview source images 712a to 712g.

According to an embodiment, the second electronic device 102 (or the third electronic device 104) may receive the preview search image 711 and may display it in a panoramic format. For example, the second electronic device 102 (or the third electronic device 104) may receive a user input 701 (e.g., a touch and drag to move the preview search image 711 up, down, left, and right, or moving the preview search image 711 based on the movement of the electronic device itself using augmented reality) for moving the preview search image 711. The second electronic device 102 (or the third electronic device 104) may display a portion of the preview search image 711 on the display based on the user input 701.

According to an embodiment, the second electronic device 102 (or the third electronic device 104) may receive a user input (e.g., a touch) for selecting a specific part of the preview search image 711. For example, when a user input for selecting the specific part is received, the second electronic device 102 (or the third electronic device 104) may display the selected preview source image (or a preview image obtained by performing basic image processing on a preview source image) (e.g., one of 712a to 712g) corresponding to the specific part on the display. The second electronic device 102 (or the third electronic device 104) may receive a user input for setting image processing on the selected preview source image. When the user input for setting the image processing is received, the second electronic device 102 (or the third electronic device 104) may request the image processing on the selected preview source image to the server 108.

The images from each electronic device 101a . . . 101g can be used to form a collection of the images that are sorted according to an angle or distance, or other location relationship with the target object.

Figure 8A:
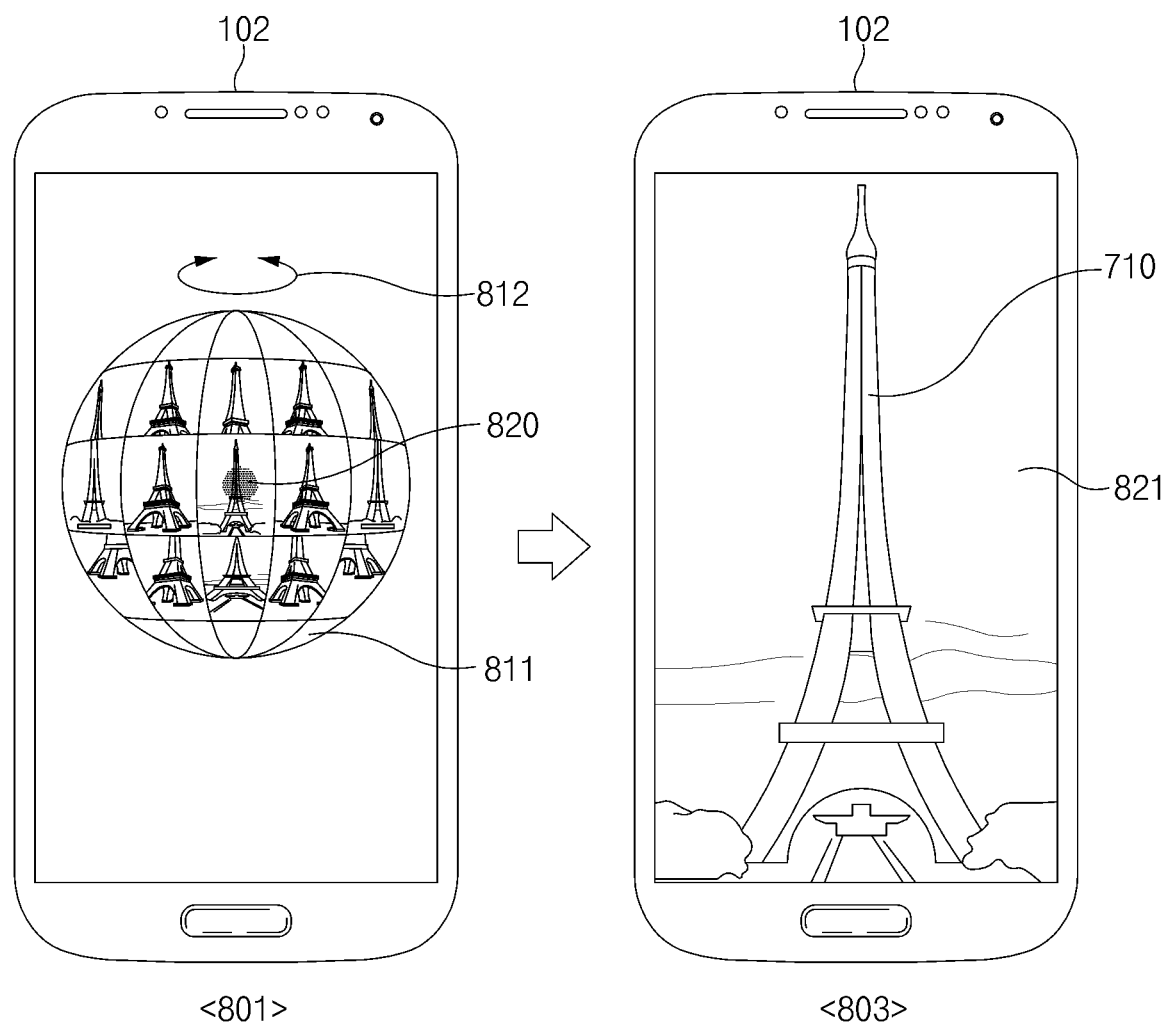
FIG. 8A is a diagram illustrating another example of a user interface of a plurality of electronic devices receiving an image processing service in a network environment according to certain embodiments.

A graphical user interface can be displayed on electronic device 102, as shown in FIG. 8A. The user can control the left and right vantage points, as well as the height with respect to the target object. For example, dragging to the left can cause the vantage point to move to the left, and a picture from an electronic device 101 that is from the left is displayed.

Figure 8B:
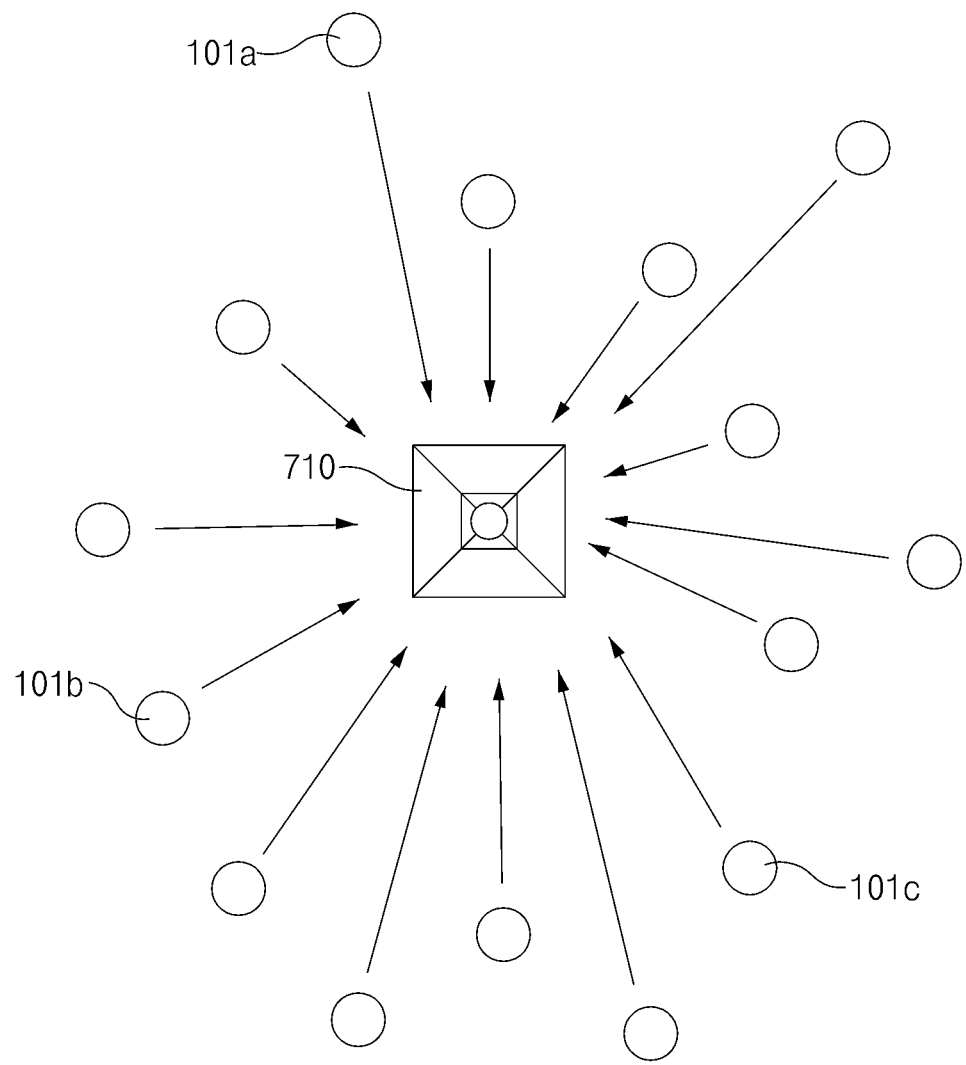
FIG. 8B is a diagram illustrating an example of a method of acquiring preview source images in a network environment according to an embodiment.
Figure 8C:
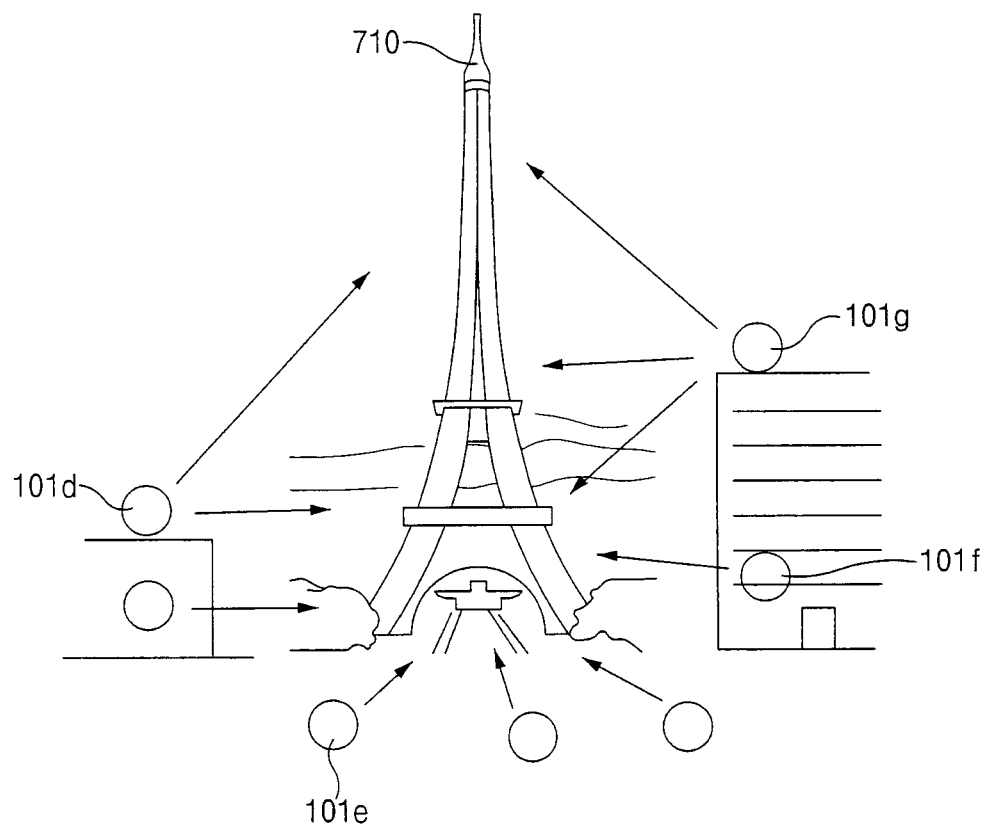
FIG. 8C is a diagram illustrating another example of a method of acquiring preview source images in a network environment according to an embodiment.

FIG. 8A is a diagram illustrating another example of a user interface of a plurality of electronic devices receiving an image processing service in a network environment according to certain embodiments. FIG. 8B is a diagram illustrating an example of a method of acquiring preview source images in a network environment according to an embodiment. FIG. 8C is a diagram illustrating another example of a method of acquiring preview source images in a network environment according to an embodiment.

Referring to FIGS. 1 and 8A to 8C, the server 108 may receive preview source images (e.g., 111a to 111c, and 712a to 712g) photographed from different locations (e.g., different directions or different heights) with respect to one specific object (or place) 710 (e.g., the Eiffel Tower in Paris) from a plurality of electronic devices (e.g., the first electronic devices 101a to 101g).

The server 108 may provide the preview source images to the second electronic device 102 (or the third electronic device 104).

Referring to FIG. 8B, some 101a, 101b, and 101c of the first electronic devices may take pictures in different directions (or angles) around the specific object (or place) 710. For example, the electronic device 101a may photograph the specific object (or place) 710 in a first direction. The electronic device 101b may photograph the specific object (or place) 710 in a second direction. The electronic device 101c may photograph the specific object (or place) 710 in a third direction.

Referring to FIG. 8C, other portions 101d, 101e, 101f, and 101g of the first electronic devices may photograph the specific object (or place) 710 at different heights. For example, the electronic device 101d may photograph the specific object (or place) 710 at a first height. The electronic device 101e may photograph the specific object (or place) 710 at a second height. The electronic device 101f may photograph the specific object (or place) 710 at a third height. The electronic device 101g may photograph the specific object (or place) 710 at a fourth height.

According to an embodiment, at least one of the first electronic devices 101a to 101g may register at least one of the preview source images in the server 108. The server 108 may provide the registered preview source images to the second electronic device 102 (or the third electronic device 104).

According to an embodiment, in 801 of FIG. 8A, the second electronic device 102 (or the third electronic device 104) may display the preview source images (or the preview images) on the display through a display method in which a photographing location (e.g., photographing direction or photographing height) is reflected. For example, the second electronic device 102 (or the third electronic device 104) may display a preview search object 811 including the preview source images (or the preview images) on the display. Each of the preview source images may be disposed in a portion of the preview search object 811. For example, the preview source images may be displayed (or arranged) in the preview search object 811 in consideration of the locations where the preview source images are photographed. When the second electronic device 102 (or the third electronic device 104) receives a first user input 812 (e.g., touch and drag), the preview search object 811 may be rotated based on the first user input 812. In a state in which the rotation of the preview search object 811 is stopped, the second electronic device 102 (or the third electronic device 104) may receive a second user input 820 (e.g., touching one of the preview source images).

According to an embodiment, in 803 of FIG. 8A, the second electronic device 102 (or the third electronic device 104) may enlarge a preview source image 821 (or a preview image) corresponding to the second user input 820 to display it on the display. For example, the second electronic device 102 (or the third electronic device 104) may request image processing on the preview source image 821 to the server 108.

Figure 9:
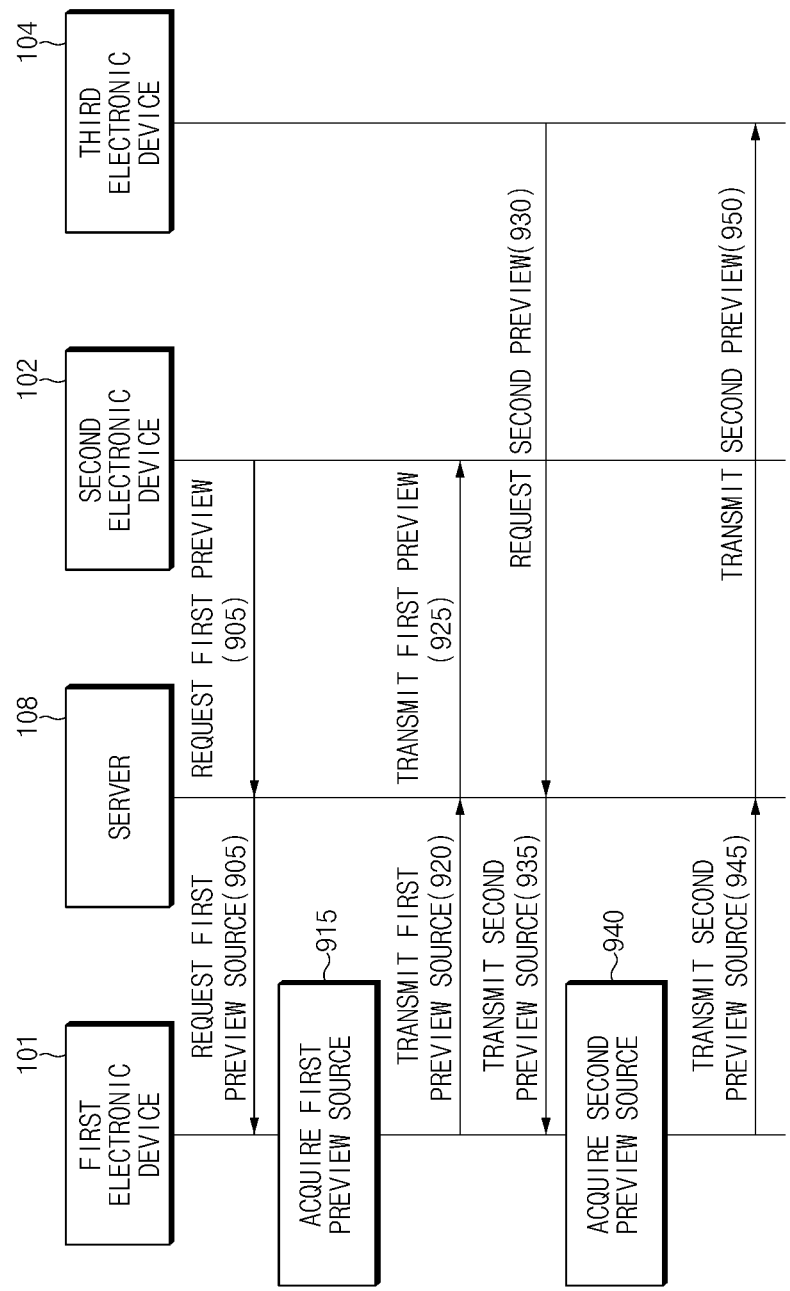
FIG. 9 is a flowchart illustrating another example of a sharing operation of a preview image in a network environment according to certain embodiments.

FIG. 9 is a flowchart illustrating another example of a sharing operation of a preview image in a network environment according to certain embodiments.

Referring to FIGS. 1 and 9, a plurality of electronic devices (e.g., the first electronic device 101 (one of 101a, 101b, and 101c of FIG. 1), the second electronic device 102, or the third electronic device 104) may be connected to the server 108 through the network 199 (e.g., a cloud network). For example, when there is a request from the second electronic device 102 or the third electronic device 104, the first electronic device 101 may photograph and provide a preview source image (e.g., raw data photographed at a location where the user of the first electronic device 101 is located).

In operation 905, the second electronic device 102 may transmit a first preview request to the server 108. In operation 910, the server 108 may transmit a first preview source request to the first electronic device 101 based on the first preview request. In operation 915, the first electronic device 101 may acquire (or photograph) a first preview source image based on the first preview source request. In operation 920, the first electronic device 101 may transmit the first preview source image to the server 108. For example, in operation 925, the server 108 may transmit the first preview source image to the second electronic device 102. Alternatively, the server 108 may transmit a first preview image generated by performing the first image processing on the first preview source image to the second electronic device 102.

In operation 930, the third electronic device 104 may transmit a second preview request to the server 108. In operations 935 to 950, the server 108 and the first electronic device 101 may obtain a second preview source image and may provide it to the third electronic device 104 in the same or similar manner to operations 905 to 925.

Figure 10:
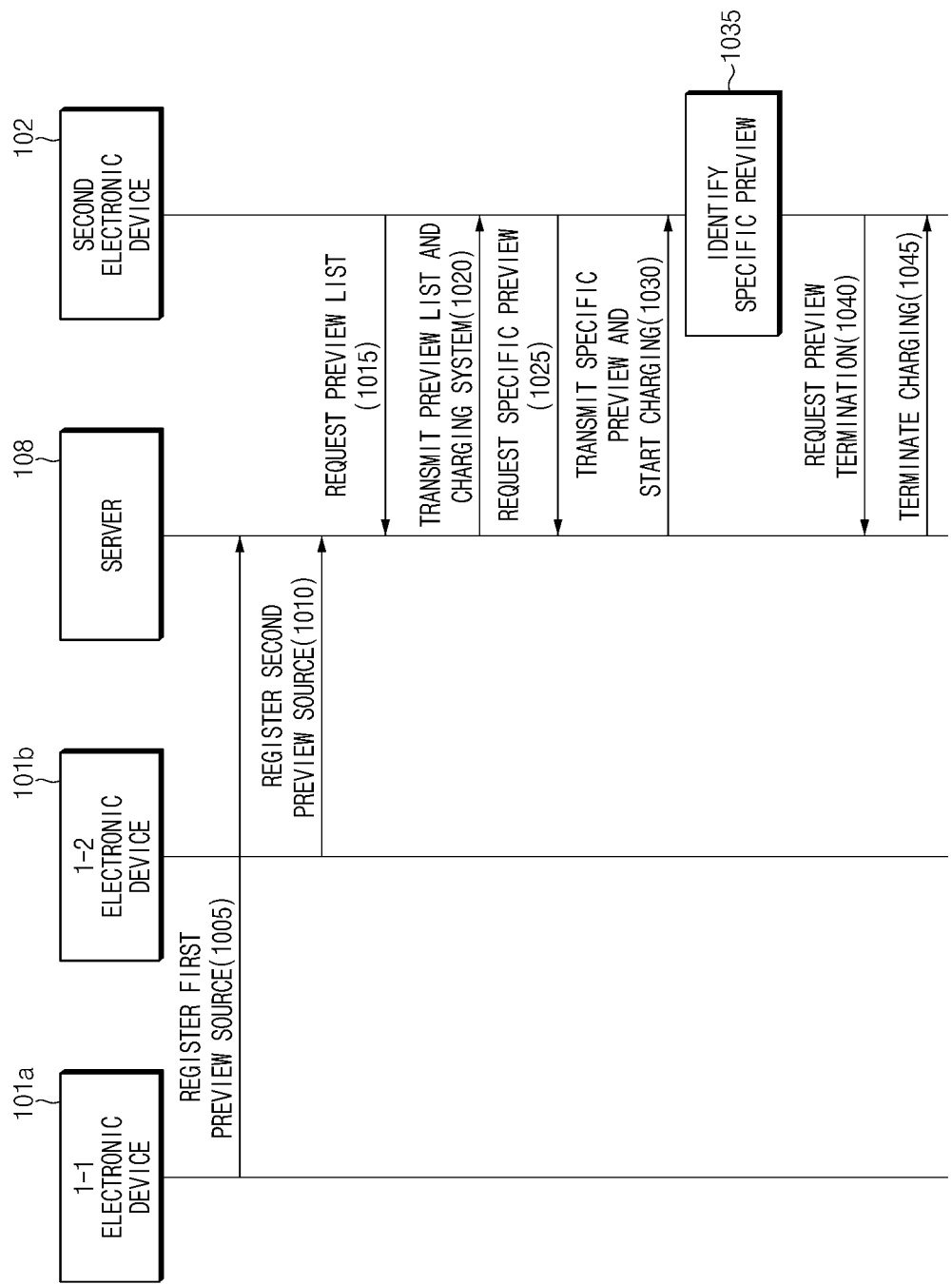
FIG. 10 is a flowchart illustrating an example of a charging method when sharing a preview image in a network environment according to an embodiment.

FIG. 10 is a flowchart illustrating an example of a charging method when sharing a preview image in a network environment according to an embodiment.

Referring to FIGS. 1 and 10, a plurality of electronic devices (e.g., the first electronic device 101 (one of 101a, 101b, and 101c of FIG. 1), the second electronic device 102, or the third electronic device 104) may be connected to the server 108 through the network 199 (e.g., a cloud network).

According to an embodiment, in operation 1005, the 1-1 electronic device 101a may photograph a first preview source image and may register the first preview source image in the server 108. In operation 1010, the 1-2 electronic device 101b may photograph a second preview source image and may register the second preview source image in the server 108. According to certain embodiments, a plurality of electronic devices may register a plurality of preview source images in the server 108. The server 108 may generate preview images obtained by performing the first image processing on the registered preview source images, and may generate and store a list of the preview images. Alternatively, the server 108 may use the preview source image as it is as the preview image without performing the first image processing.

According to an embodiment, in operation 1015, the second electronic device 102 (and/or the third electronic device 104) may request a preview image list to the server 108. In operation 1020, the server 108 may transmit the preview image list in response to the request of the second electronic device 102, and may also transmit charging system information. In operation 1025, the second electronic device 102 may request a specific preview image selected from the preview image list to the server 108. In operation 1030, the server 108 may transmit the specific preview image in response to the request of the second electronic device 102 and may start the charging.

According to an embodiment, in operation 1035, the second electronic device 102 may identify the specific preview. In operation 1040, the second electronic device 102 may transmit a preview termination request for the specific preview image to the server 108. In operation 1045, the server 108 may terminate the charging in response to the preview termination request.

Figure 11:
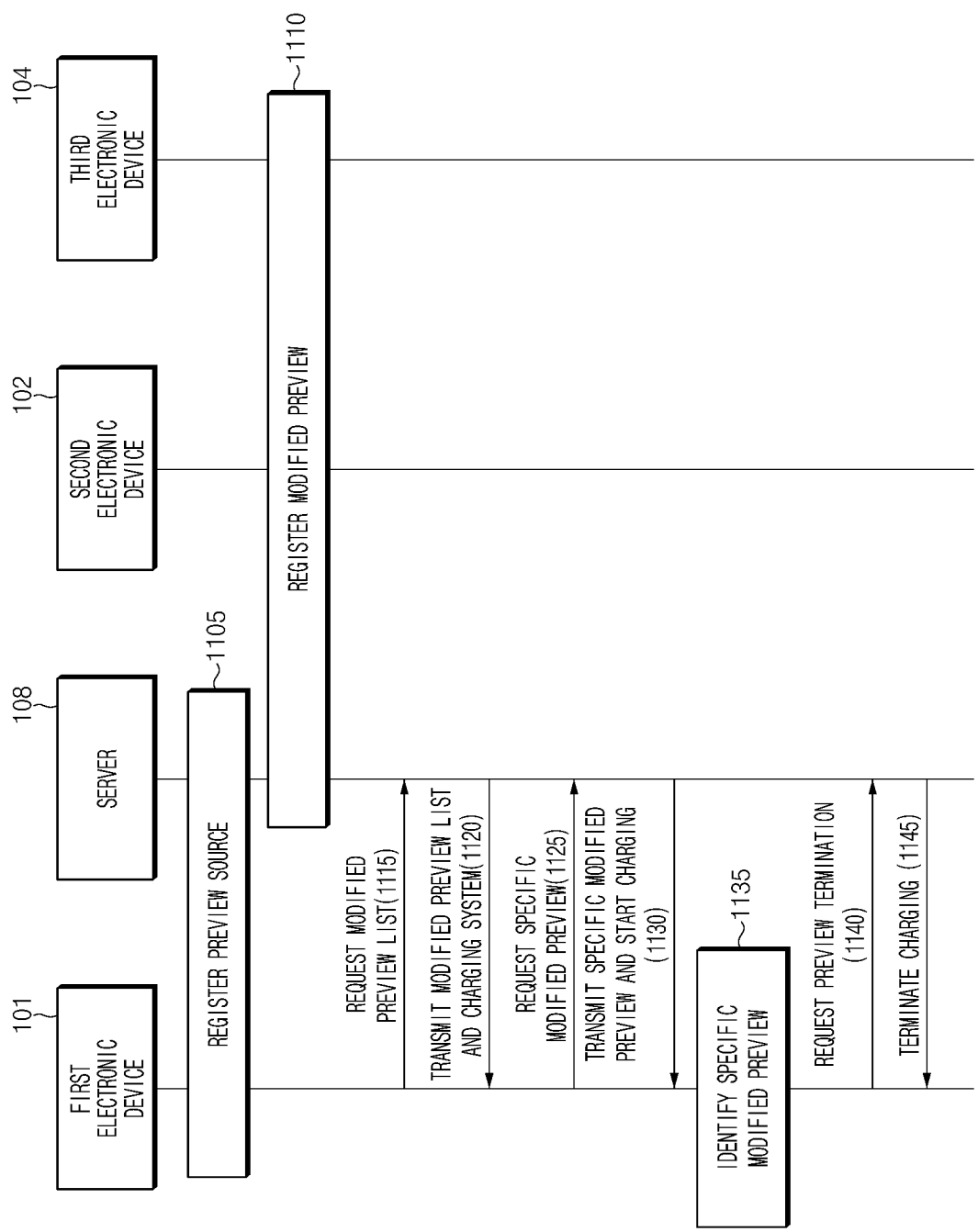
FIG. 11 is a flowchart illustrating another example of a charging method when sharing a preview image in a network environment according to certain embodiments.

FIG. 11 is a flowchart illustrating another example of a charging method when sharing a preview image in a network environment according to certain embodiments.

Referring to FIGS. 1 and 11, a plurality of electronic devices (e.g., the first electronic device 101 (one of 101a, 101b, and 101c of FIG. 1), the second electronic device 102, or the third electronic device 104) may be connected to the server 108 through the network 199 (e.g., a cloud network).

According to an embodiment, in operation 1105, the first electronic devices (e.g., at least one of the electronic devices 101a, 101b, 101c) may register at least one preview source image in the server 108. In operation 1110, the second electronic device 102 and the third electronic device 104 may identify the preview source images registered in the server 108, and may register (e.g., requesting the second image processing on the preview source image) a modified preview image with respect to at least one of the registered preview source images.

According to an embodiment, in operation 1115, the first electronic device 101 may request the modified preview list to the server 108. In operation 1120, the server 108 may transmit the modified preview list in response to the request of the first electronic device 101, and may also transmit charging system information. In operation 1125, the first electronic device 101 may request a specific modified preview image selected from the modified preview image list. In operation 1130, the server 108 may transmit the specific modified preview image in response to the request of the first electronic device 101 and may start the charging.

According to an embodiment, in operation 1135, the first electronic device 101 may identify the received specific modified preview image. In operation 1140, the first electronic device 101 may transmit a preview termination request for the specific preview image to the server 108. In operation 1145, the server 108 may terminate the charging in response to the preview termination request.

According to certain embodiments, an electronic device (e.g., the server 108) includes a communication module (e.g., a communication module 1290 to be described later) and a processor (e.g., a processor 1220 to be described later) that is operatively connected to the communication module and transmits and receives data to and from external electronic devices through the communication module. The processor receives a preview source image from a first external electronic device (e.g., the first electronic device 101), performs a first image processing on the preview source image, thereby resulting in a preview image; transmits the preview image to a second external electronic device (one of the electronic devices 102, 104, and 106) and a third external electronic device (one of the electronic devices 102, 104, and 106), receives a request for second image processing from the second external electronic device; transmits a first modified preview image obtained by performing the second image processing on the preview image to the second external electronic device in response to the request; receive a request for third image processing from the third external electronic device, and transmits a second modified preview image obtained by performing the third image processing on the preview image to the third external electronic device.

According to certain embodiments, the processor may request the still source image corresponding to the preview source image to the first external electronic device when a request for a still image corresponding to the first modified preview image is received from the second external electronic device.

According to certain embodiments, the processor may transmit a first modified still image obtained by performing the second image processing on the still source image to the second external electronic device, when the still source image from the first external electronic device is received.

According to certain embodiments, the preview source image may have a smaller data size than the preview source image.

According to certain embodiments, the preview source image may have a resolution less than the preview source image.

According to certain embodiments, the processor may transmit the first modified preview image and the second modified preview image to the first external electronic device.

According to certain embodiments, the processor may request a still source image corresponding to the preview source image to the first external electronic device when a request for a still image corresponding to the second modified preview image from the third external electronic device is received.

According to certain embodiments, the processor may transmit a second modified still image obtained by performing the third image processing on the still source image to the third external electronic device, when the still source image from the first external electronic device is received.

According to certain embodiments, the processor may receive and store a plurality of preview source images from the first external electronic device, and may transmit the plurality of preview source images to the second external electronic device or the third external electronic device when a preview transmission request from the second external electronic device or the third external electronic device is received.

According to certain embodiments, the processor may modify a file format through the first image processing.

According to certain embodiments, the second external electronic device or the third external electronic device may be located in a different location from the first external electronic device.

According to certain embodiments, an electronic device (e.g., one of the electronic devices 102, 104, and 106) includes a communication module (e.g., the communication module 1290 to be described later) and a processor (e.g., the processor 1220 to be described later) that is operatively connected to the communication module and transmits and receives data to and from a first electronic device through the communication module. The processor receives, from the first external electronic device (e.g., the server 108), a preview image, wherein the preview image comprises application of a first image processing on a preview source image photographed by a second external electronic device (e.g., the first electronic device 101) through the first external electronic device, requests the second image processing related to the preview image to the first external electronic device, and receives a modified preview image obtained, wherein the modified preview image comprises application of the second image processing on the preview image from the first external electronic device.

According to certain embodiments, the processor may request a modified still image corresponding to the modified preview image to the first external electronic device, and may receive the modified still image, wherein the modified still image comprises application of the second image processing on a still source image transmitted from the second external electronic device from the first external electronic device.

According to certain embodiments, the modified preview image may have a capacity less than or equal to a specified size, and the modified still image may have a larger capacity than the preview source image.

According to certain embodiments, the modified preview image may have a resolution less than or equal to a specified size, and the modified still image may have a higher resolution than the preview source image.

According to certain embodiments, the electronic device may further include a display (e.g., a display device 1260 to be described later), and the processor may receive a plurality of preview images related to a specific place from the first external electronic device, and may display the plurality of preview images in a panoramic format through the display.

According to certain embodiments, the electronic device may further include a display, and the processor may receive a plurality of preview images related to a specific place from the first external electronic device, and may display the plurality of preview images through the display as a preview search object, the preview search object may be divided into a plurality of regions, and the plurality of preview images may be arranged one-to-one in the plurality of regions.

According to certain embodiments, the processor may display the preview search object to rotate on the display based on a first user input related to the preview search object, and may enlarge a preview image corresponding to a portion of the preview search object based on a second user input related to the portion of the preview search object.

According to certain embodiments, an electronic device (e.g., the server 108) includes a communication module (e.g., the communication module 1290 to be described later) and a processor (e.g., the processor 1220 to be described later) that is operatively connected to the communication module and transmits and receives data to and from external electronic devices through the communication module. The processor receives a preview source image from at least one external electronic device (e.g., the first electronic device 101), transmits a preview image obtained by performing a first image processing on the preview source image to a plurality of external terminal devices (e.g., the electronic devices 102, 104, and 106), individually receives a request for additional image processing related to the preview image from the plurality of external terminal devices, and individually transmits modified preview images obtained by performing the additional image processing on the preview image to the plurality of external terminal devices in response to the received request, in response to the request for the additional image processing.

According to certain embodiments, the processor may transmit the modified preview images to the at least one external electronic device.

According to certain embodiments, a non-transitory computer-readable medium storing a plurality of instructions, wherein execution of the plurality of instructions by a processor causes the processor to perform a plurality of operations comprising: receiving a preview source image from a first external electronic device; performing a first image processing on the preview source image, thereby resulting in a preview image; transmitting the preview image to a second external electronic device and a third external electronic device; receiving a request for second image processing from the second external electronic device; transmitting a first modified preview image obtained by performing the second image processing on the preview image to the second external electronic device in response to the request; receiving a request for third image processing form the third external electronic device; and transmitting a second modified preview image obtained by performing the third image processing on the preview image to the third external electronic device.

According to certain embodiments, the plurality of operations further comprises: requesting a still source image corresponding to the preview source image to the first external electronic device when a request for the still image corresponding to the first modified preview image is received from the second external electronic device.

According to certain embodiments, the plurality of operations further comprises: transmitting a first modified still image obtained by performing the second image processing on the still source image, to the second external electronic device.

According to certain embodiments, the preview source image has a smaller data size than the still source image.

According to certain embodiments, the preview source image has a resolution less than the resolution of the still source image.

Figure 12:
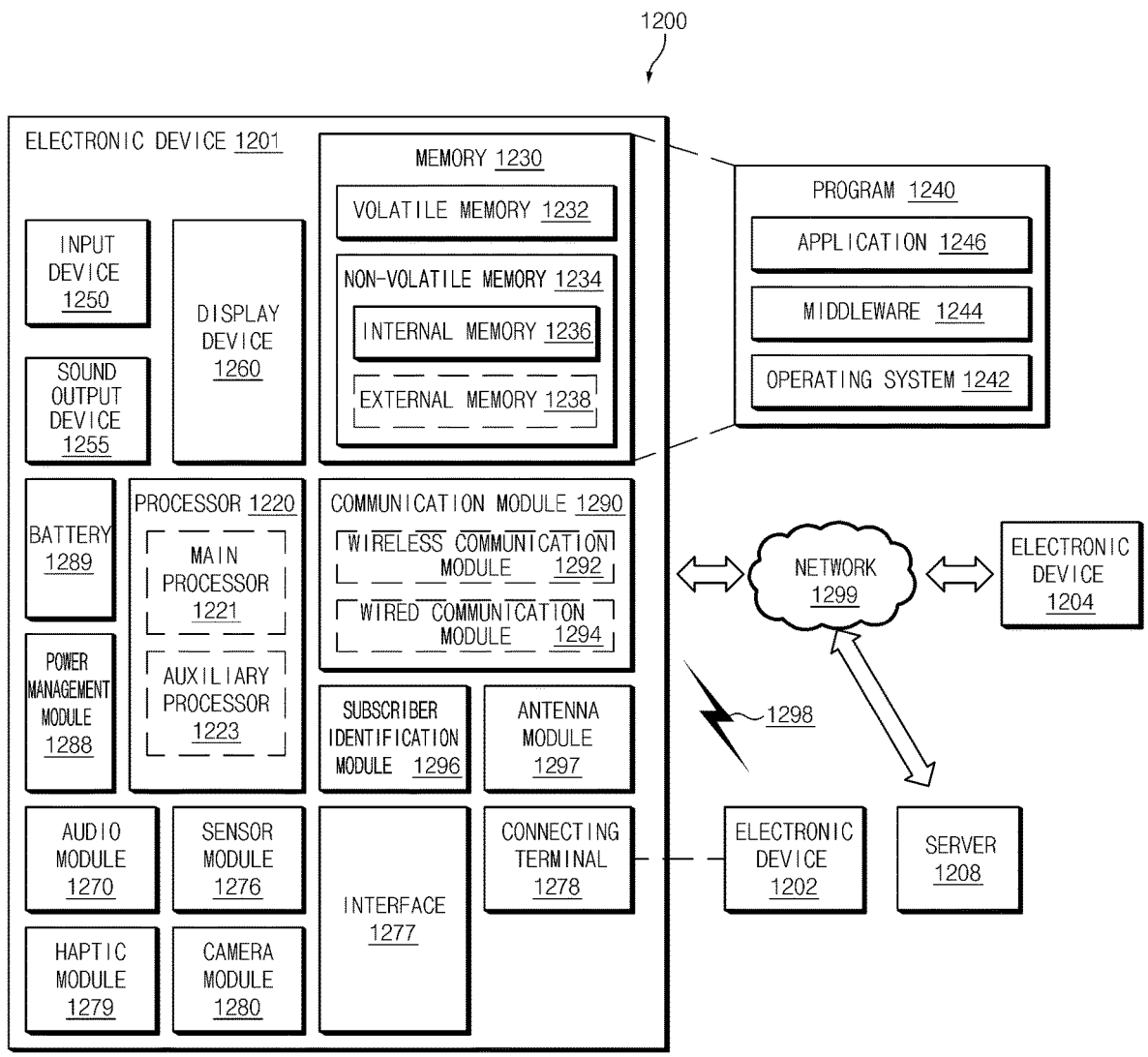
FIG. 12 is a block diagram of an electronic device in a network environment according to certain embodiments.

FIG. 12 is a block diagram illustrating an electronic device 1201 in a network environment 1200 according to certain embodiments. Referring to FIG. 12, the electronic device 1201 in the network environment 1200 may communicate with an electronic device 1202 via a first network 1298 (e.g., a short-range wireless communication network), or an electronic device 1204 or a server 1208 via a second network 1299 (e.g., a long-range wireless communication network). According to an embodiment, the electronic device 1201 may communicate with the electronic device 1204 via the server 1208. According to an embodiment, the electronic device 1201 may include a processor 1220, memory 1230, an input device 1250, a sound output device 1255, a display device 1260, an audio module 1270, a sensor module 1276, an interface 1277, a haptic module 1279, a camera module 1280, a power management module 1288, a battery 1289, a communication module 1290, a subscriber identification module (SIM) 1296, or an antenna module 1297. In some embodiments, at least one (e.g., the display device 1260 or the camera module 1280) of the components may be omitted from the electronic device 1201, or one or more other components may be added in the electronic device 1201. In some embodiments, some of the components may be implemented as single integrated circuitry. For example, the sensor module 1276 (e.g., a fingerprint sensor, an iris sensor, or an illuminance sensor) may be implemented as embedded in the display device 1260 (e.g., a display).

The processor 1220 may execute, for example, software (e.g., a program 1240) to control at least one other component (e.g., a hardware or software component) of the electronic device 1201 coupled with the processor 1220, and may perform various data processing or computation. According to one embodiment, as at least part of the data processing or computation, the processor 1220 may load a command or data received from another component (e.g., the sensor module 1276 or the communication module 1290) in volatile memory 1232, process the command or the data stored in the volatile memory 1232, and store resulting data in non-volatile memory 1234. According to an embodiment, the processor 1220 may include a main processor 1221 (e.g., a central processing unit (CPU) or an application processor (AP)), and an auxiliary processor 1223 (e.g., a graphics processing unit (GPU), an image signal processor (ISP), a sensor hub processor, or a communication processor (CP)) that is operable independently from, or in conjunction with, the main processor 1221. Additionally or alternatively, the auxiliary processor 1223 may be adapted to consume less power than the main processor 1221, or to be specific to a specified function. The auxiliary processor 1223 may be implemented as separate from, or as part of the main processor 1221.

The auxiliary processor 1223 may control at least some of functions or states related to at least one component (e.g., the display device 1260, the sensor module 1276, or the communication module 1290) among the components of the electronic device 1201, instead of the main processor 1221 while the main processor 1221 is in an inactive (e.g., sleep) state, or together with the main processor 1221 while the main processor 1221 is in an active state (e.g., executing an application). According to an embodiment, the auxiliary processor 1223 (e.g., an image signal processor or a communication processor) may be implemented as part of another component (e.g., the camera module 1280 or the communication module 1290) functionally related to the auxiliary processor 1223.

The memory 1230 may store various data used by at least one component (e.g., the processor 1220 or the sensor module 1276) of the electronic device 1201. The various data may include, for example, software (e.g., the program 1240) and input data or output data for a command related thereto. The memory 1230 may include the volatile memory 1232 or the non-volatile memory 1234.

The program 1240 may be stored in the memory 1230 as software, and may include, for example, an operating system (OS) 1242, middleware 1244, or an application 1246.

The input device 1250 may receive a command or data to be used by other component (e.g., the processor 1220) of the electronic device 1201, from the outside (e.g., a user) of the electronic device 1201. The input device 1250 may include, for example, a microphone, a mouse, or a keyboard.

The sound output device 1255 may output sound signals to the outside of the electronic device 1201. The sound output device 1255 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 1260 may visually provide information to the outside (e.g., a user) of the electronic device 1201. The display device 1260 may include, for example, a display, a hologram device, or a projector and control circuitry to control a corresponding one of the display, hologram device, and projector. According to an embodiment, the display device 1260 may include touch circuitry adapted to detect a touch, or sensor circuitry (e.g., a pressure sensor) adapted to measure the intensity of force incurred by the touch.

The audio module 1270 may convert a sound into an electrical signal and vice versa. According to an embodiment, the audio module 1270 may obtain the sound via the input device 1250, or output the sound via the sound output device 1255 or a headphone of an external electronic device (e.g., an electronic device 1202) directly (e.g., wiredly) or wirelessly coupled with the electronic device 1201.

The sensor module 1276 may detect an operational state (e.g., power or temperature) of the electronic device 1201 or an environmental state (e.g., a state of a user) external to the electronic device 1201, and then generate an electrical signal or data value corresponding to the detected state. According to an embodiment, the sensor module 1276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1277 may support one or more specified protocols to be used for the electronic device 1201 to be coupled with the external electronic device (e.g., the electronic device 1202) directly (e.g., wiredly) or wirelessly. According to an embodiment, the interface 1277 may include, for example, a high definition multimedia interface (HDMI), a universal serial bus (USB) interface, a secure digital (SD) card interface, or an audio interface.

A connecting terminal 1278 may include a connector via which the electronic device 1201 may be physically connected with the external electronic device (e.g., the electronic device 1202). According to an embodiment, the connecting terminal 1278 may include, for example, a HDMI connector, a USB connector, a SD card connector, or an audio connector (e.g., a headphone connector), The haptic module 1279 may convert an electrical signal into a mechanical stimulus (e.g., a vibration or a movement) or electrical stimulus which may be recognized by a user via his tactile sensation or kinesthetic sensation. According to an embodiment, the haptic module 1279 may include, for example, a motor, a piezoelectric element, or an electric stimulator.

The camera module 1280 may capture a still image or moving images. According to an embodiment, the camera module 1280 may include one or more lenses, image sensors, image signal processors, or flashes.

The power management module 1288 may manage power supplied to the electronic device 1201. According to one embodiment, the power management module 1288 may be implemented as at least part of, for example, a power management integrated circuit (PMIC).

The battery 1289 may supply power to at least one component of the electronic device 1201. According to an embodiment, the battery 1289 may include, for example, a primary cell which is not rechargeable, a secondary cell which is rechargeable, or a fuel cell.

The communication module 1290 may support establishing a direct (e.g., wired) communication channel or a wireless communication channel between the electronic device 1201 and the external electronic device (e.g., the electronic device 1202, the electronic device 1204, or the server 1208) and performing communication via the established communication channel. The communication module 1290 may include one or more communication processors that are operable independently from the processor 1220 (e.g., the application processor (AP)) and supports a direct (e.g., wired) communication or a wireless communication. According to an embodiment, the communication module 1290 may include a wireless communication module 1292 (e.g., a cellular communication module, a short-range wireless communication module, or a global navigation satellite system (GNSS) communication module) or a wired communication module 1294 (e.g., a local area network (LAN) communication module or a power line communication (PLC) module). A corresponding one of these communication modules may communicate with the external electronic device via the first network 1298 (e.g., a short-range communication network, such as Bluetooth™, wireless-fidelity (Wi-Fi) direct, or infrared data association (IrDA)) or the second network 1299 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1292 may identify and authenticate the electronic device 1201 in a communication network, such as the first network 1298 or the second network 1299, using subscriber information (e.g., international mobile subscriber identity (IMSI)) stored in the subscriber identification module 1296.

The antenna module 1297 may transmit or receive a signal or power to or from the outside (e.g., the external electronic device) of the electronic device 1201. According to an embodiment, the antenna module 1297 may include one or more antennas, and, therefrom, at least one antenna appropriate for a communication scheme used in the communication network, such as the first network 1298 or the second network 1299, may be selected, for example, by the communication module 1290 (e.g., the wireless communication module 1292). The signal or the power may then be transmitted or received between the communication module 1290 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1201 and the external electronic device 1204 via the server 1208 coupled with the second network 1299. Each of the electronic devices 1202 and 1204 may be a device of a same type as, or a different type, from the electronic device 1201. According to an embodiment, all or some of operations to be executed at the electronic device 1201 may be executed at one or more of the external electronic devices 1202, 1204, or 1208. For example, if the electronic device 1201 should perform a function or a service automatically, or in response to a request from a user or another device, the electronic device 1201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1201. The electronic device 1201 may provide the outcome, with or without further processing of the outcome, as at least part of a reply to the request. To that end, a cloud computing, distributed computing, or client-server computing technology may be used, for example.

The electronic device according to certain embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 1240) including one or more instructions that are stored in a storage medium (e.g., internal memory 1236 or external memory 1238) that is readable by a machine (e.g., the electronic device 1201). For example, a processor (e.g., the processor 1220) of the machine (e.g., the electronic device 1201) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

The term "processor" shall be understood to refer to both the singular and plural contexts.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Although certain embodiments have been described with a degree of particularity, it shall be understood that the foregoing embodiments and not limiting. Moreover, the certain embodiments can be modified, have components added, and have components omitting. While remaining within the scope of this document. Accordingly, this document shall only be limited by the attached claims and equivalents thereof.

What is claimed is:

1. An electronic device comprising:
   a communication module; and
   a processor operatively connected to the communication module and configured to transmit and receive data to and from external electronic devices through the communication module, and
   wherein the processor is configured to:
   receive a preview source image from a first external electronic device, wherein the preview source image is associated with an image photographed through a camera of the first external electronic device;
   performing a first image processing on the preview source image, thereby resulting in a preview image;
   transmit the preview image to a second external electronic device and a third external electronic device;
   receive a request for second image processing from the second external electronic device;
   transmit a first modified preview image obtained by performing the second image processing on the preview image to the second external electronic device in response to the request;
   receive a request for third image processing from the third external electronic device;
   transmit a second modified preview image obtained by performing the third image processing on the preview image to the third external electronic device;
   request, to the first external electronic device, a still source image associated with the photographed image when a request for a still image corresponding to the first modified preview image is received from the second external electronic device, wherein the still source image and the preview source image are obtained by the first external electronic device at substantially a same time; and
   transmit, to the second external electronic device, a first modified still image obtained by performing the second image processing on the still source image.

2. The electronic device of claim 1, wherein the preview source image has a smaller data size than the still source image.

3. The electronic device of claim 1, wherein the preview source image has a resolution less than the resolution of the still source image.

4. The electronic device of claim 1, wherein the processor is configured to:
   transmit the first modified preview image and the second modified preview image to the first external electronic device.

5. The electronic device of claim 1, wherein the processor is configured to:
   request, the first external electronic device, the still source image associated with the photographed image when a request for a still image corresponding to the second modified preview image from the third external electronic device is received; and
   transmit, to the third external electronic device, a second modified still image obtained by performing the third image processing on the still source image.

6. The electronic device of claim 1, wherein the processor is configured to:
   receive and store a plurality of preview source images from the first external electronic device; and
   transmit the plurality of preview source images to the second external electronic device or the third external electronic device when a preview transmission request from the second external electronic device or the third external electronic device is received.

7. The electronic device of claim 1, wherein the processor is configured to:
   modify a file format through the first image processing.

8. An electronic device comprising:
   a communication module; and
   a processor operatively connected to the communication module and configured to transmit and receive data to and from a first external electronic device through the communication module, and
   wherein the processor is configured to:
   receive, from the first external electronic device, a preview image, wherein the preview image comprises application of a first image processing on a preview source image associated with an image photographed through a camera of a second external electronic device;
   request a second image processing related to the preview image to the first external electronic device; and
   receive a modified preview image obtained, wherein the modified preview image comprises application of the second image processing on the preview image,
   wherein a still source image and the preview source image are obtained by the first external electronic device at substantially a same time.

9. The electronic device of claim 8, wherein the processor is configured to:
   request a modified still image corresponding to the modified preview image to the first external electronic device; and
   receive, from the first external electronic device, the modified still image, wherein the modified still image comprises application of the second image processing on a still source image associated with the image photographed through the camera of the second external electronic device and transmitted from the second external electronic device.

10. The electronic device of claim 8, further comprising:
    a display, and
    wherein the processor is configured to:
    receive a plurality of preview images related to a specific place from the first external electronic device; and
    display the plurality of preview images in a panoramic format through the display.

11. The electronic device of claim 8, further comprising:
    a display,
    wherein the processor is configured to:
    receive a plurality of preview images related to a specific place from the first external electronic device; and
    display the plurality of preview images as preview search objects through the display, wherein the preview search objects are divided into a plurality of regions, and arrange the plurality of preview images one-to-one in the plurality of regions.

12. The electronic device of claim 11, wherein the processor is configured to:
   display the preview search objects to rotate on the display based on a first user input associated with the preview search objects; and
   enlarge a preview image corresponding to a portion of the preview search objects based on a second user input associated with the portion of the preview search objects.

13. A non-transitory computer-readable medium storing a plurality of instructions, wherein execution of the plurality of instructions by a processor causes the processor to perform a plurality of operations comprising:
   receiving a preview source image from a first external electronic device, wherein the preview source image is associated with an image photographed through a camera of the first external electronic device;
   performing a first image processing on the preview source image, thereby resulting in a preview image;
   transmitting the preview image to a second external electronic device and a third external electronic device;
   receiving a request for second image processing from the second external electronic device;
   transmitting a first modified preview image obtained by performing the second image processing on the preview image to the second external electronic device in response to the request;
   receiving a request for third image processing form the third external electronic device; and
   transmitting a second modified preview image obtained by performing the third image processing on the preview image to the third external electronic device,
   requesting, to first external electronic device, a still source image associated with the photographed image when a request for a still image corresponding to the first modified preview image is received from the second external electronic device, wherein the still source image and the preview source image are obtained by the first external electronic device at substantially a same time; and
   transmitting, to the second external electronic device, a first modified still image obtained by performing the second image processing on the still source image.

14. The non-transitory computer-readable medium of claim 13, wherein the plurality of operations further comprises:
   requesting, to the first external electronic device, the still source image associated with the photographed image when a request for a still image corresponding to the second modified preview image from the third external electronic device is received; and
   transmitting, to the third external electronic device, a second modified still image obtained by performing the third image processing on the still source image.

15. The non-transitory computer-readable medium of claim 14, wherein the plurality of operations further comprises:
   modifying a file format through the first image processing.

16. The non-transitory computer-readable medium of claim 13, wherein the preview source image has a smaller data size than the still source image.

17. The non-transitory computer-readable medium of claim 13, wherein the preview source image has a resolution less than the resolution of the still source image.

* * * * *